(12) United States Patent
Kubota et al.

(10) Patent No.: US 11,895,585 B2
(45) Date of Patent: Feb. 6, 2024

(54) DATA TRANSFER BETWEEN AN INACTIVE MODE USER EQUIPMENT AND A WIRELESS NETWORK

(71) Applicant: QUALCOMM Incorporated, San Diego, CA (US)

(72) Inventors: Keiichi Kubota, Tokyo (JP); Gavin Bernard Horn, La Jolla, CA (US); Soo Bum Lee, San Diego, CA (US); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 16/957,669

(22) PCT Filed: Jan. 31, 2019

(86) PCT No.: PCT/CN2019/074301
§ 371 (c)(1),
(2) Date: Jun. 24, 2020

(87) PCT Pub. No.: WO2019/149258
PCT Pub. Date: Aug. 8, 2019

(65) Prior Publication Data
US 2020/0351782 A1    Nov. 5, 2020

(30) Foreign Application Priority Data
Feb. 3, 2018  (WO) ............... PCT/CN2018/075191

(51) Int. Cl.
*H04W 52/02* (2009.01)
*H04W 36/00* (2009.01)
*H04W 48/08* (2009.01)

(52) U.S. Cl.
CPC ... *H04W 52/0229* (2013.01); *H04W 36/0033* (2013.01); *H04W 48/08* (2013.01)

(58) Field of Classification Search
CPC ......... H04W 52/0229; H04W 36/0033; H04W 48/08; H04W 60/04; H04W 76/27; H04W 76/25; H04W 76/11
See application file for complete search history.

(56) References Cited

U.S. PATENT DOCUMENTS 9,532,311 B1 * 12/2016 Chhabra ........... H04W 52/0261
10,206,147 B2    2/2019 Horn et al.
(Continued)

FOREIGN PATENT DOCUMENTS

| CN | 105103646 A | 11/2015 |
| WO | 2015095708 A2 | 6/2015 |

(Continued)

OTHER PUBLICATIONS

"3rd Generation Partnership Project, Technical Specification Group Radio Access Network; Study on New Radio Access Network; Study on New Radio Access Technology; Radio Interface Protocol Aspects (Release 14)", 3GPP Standard; Technical Report; 3GPP TR 38.804, 3rd Generation Partnership Project (3GPP), Mobile Competence Centre; 650, Route Des Lucioles; F-06921 Sophia-Antipolis Cedex; France, vol. RAN WG2, No. V14.0.0, Mar. 24, 2017, pp. 1-57, XP051297619, [retrieved on Mar. 24, 2017] para.4,5 and para.10.2.

(Continued)

*Primary Examiner* — Marcos L Torres
(74) *Attorney, Agent, or Firm* — Procopio, Cory, Hargreaves & Savitch LLP

(57) ABSTRACT

In an aspect of the disclosure, a method, a computer-readable medium, and an apparatus are provided that improve data packet exchange between a UE in an inactive mode and a network. In certain configurations, the apparatus may receive, from a user equipment (UE) in an active mode, a first packet including a first identifier associated with an anchor base station, a second identifier associated with a UE (Continued)

context, and a payload. The apparatus may identify the anchor base station based at least in part on one or more of the first identifier associated with the anchor base station or the second identifier associated with the UE context. The apparatus may transmit a second packet to the anchor base station. The second packet may include at least a portion of the first packet.

30 Claims, 24 Drawing Sheets

(56) References Cited

U.S. PATENT DOCUMENTS

| | | | | |
|---|---|---|---|---|
| 2009/0092138 | A1* | 4/2009 | Joo | H04W 28/065 370/392 |
| 2015/0163695 | A1* | 6/2015 | Li | H04L 1/0091 370/328 |
| 2016/0212661 | A1 | 7/2016 | Basu et al. | |
| 2018/0234839 | A1* | 8/2018 | Tenny | H04W 12/10 |
| 2019/0045408 | A1 | 2/2019 | Kim et al. | |
| 2019/0150221 | A1* | 5/2019 | Tseng | H04W 76/27 370/331 |

FOREIGN PATENT DOCUMENTS

| | | |
|---|---|---|
| WO | 2017183949 A1 | 10/2017 |
| WO | 2017188787 A2 | 11/2017 |
| WO | 2017194104 A1 | 11/2017 |
| WO | 2017196126 A1 | 11/2017 |

OTHER PUBLICATIONS

International Search Report and Written Opinion—PCT/CN2018/075191—ISA/EPO—dated Nov. 9, 2018.
International Search Report and Written Opinion—PCT/CN2019/074301—ISA/EPO—dated Apr. 2, 2019.
LG Electronics Inc., "Anchor Relocation in RRC_INACTIVE", 3GPP TSG-RAN WG2 NR AH R2-1801353 Jan. 12, 2018, 2 pages.
Qualcomm Incorporated: "RRC_INACTIVE Context ID", 3GPP TSG-RAN2 Meeting #AH-1801 R2-1800214 Jan. 12, 2018, 2 pages.
Qualcomm Incorporated: "UE AS Context for RRC_INACTIVE", 3GPP TSG-RAN2 Meeting #AH-1801 R2-1800213 Jan. 12, 2018, 4 pages.
Ericsson: "Clause 6.8.2.1 (Key Handling—RRC Inactive/Connected State Transition)", 3GPP TSG SA WG3 (Security) Meeting #90, 3GPP Draft, 3rd Generation Partnership Project (3GPP), Mobile Competence Centre, 650, Route Des Lucioles, F-06921 Sophia-Antipolis Cedex, France, vol. SA WG3, No. Gothenburg, Sweden, Jan. 22-26, 2018, Jan. 15, 2018 (Jan. 15, 2018), 7 Pages, XP051390724, URL: https://www.3gpp.org/ftp/tsg_sa/WG3_Security/TSGS3_90_Gothenburg/Docs/, S3-180272.zip [retrieved on Jan. 15, 2018], The whole document.
Huawei., et al., "Key Handling at Transitions between RRC-Inactive and RRC-Connected States", 3GPP TSG SA WG3 (Security) Meeting #90, 3GPP Draft, 3rd Generation Partnership Project (3GPP), Mobile Competence Centre, 650, Route Des Lucioles, F-06921 Sophia-Antipolis Cedex, France, vol. SA WG3, No. Gothenburg, Sweden, Jan. 22-26, 2018, Jan. 15, 2018 (Jan. 15, 2018), 3 Pages, URL: http://www.3gpp.org/ftp/tsg%5Fsa/WG3%6FSecurity/TSGS3%5F90%5FGothenburg/Docs/, S3-180149.zip [retrieved on Jan. 15, 2018], The whole document.
Supplementary European Search Report—EP19747259—Search Authority—Berlin—dated Nov. 11, 2021.

\* cited by examiner

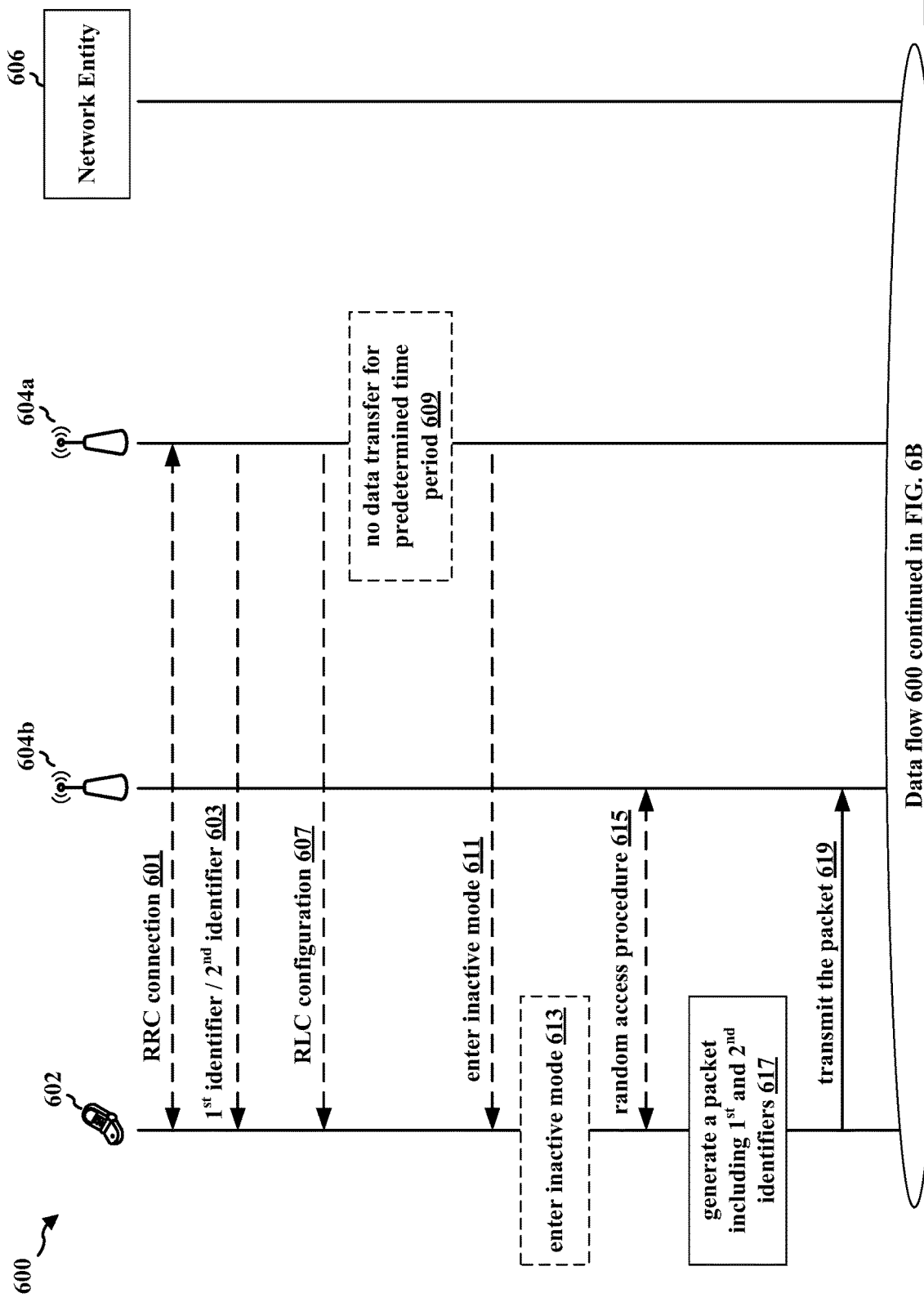

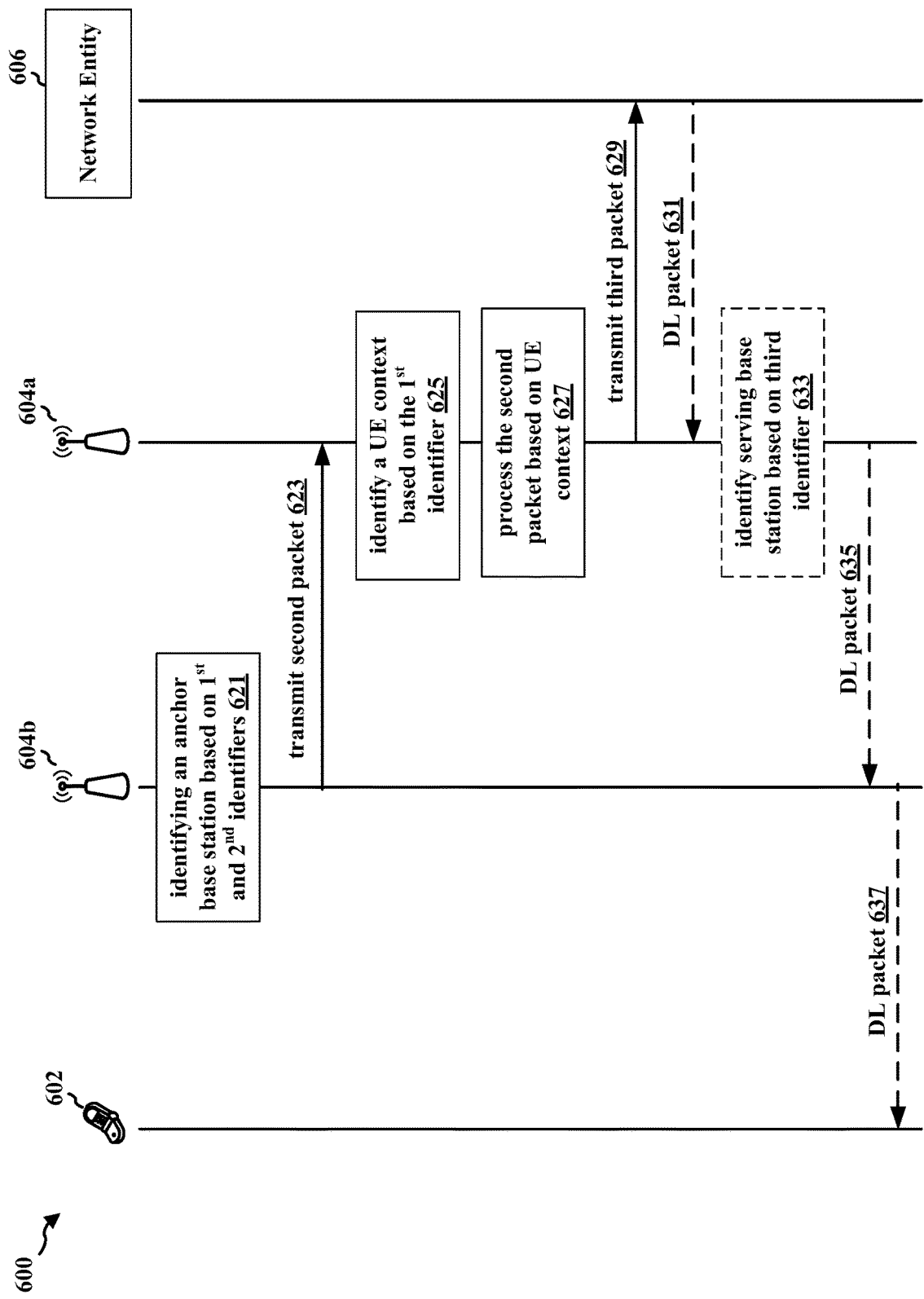

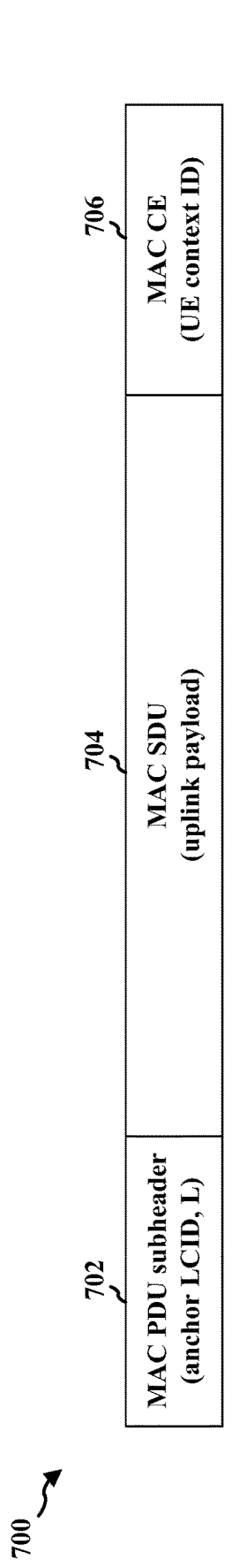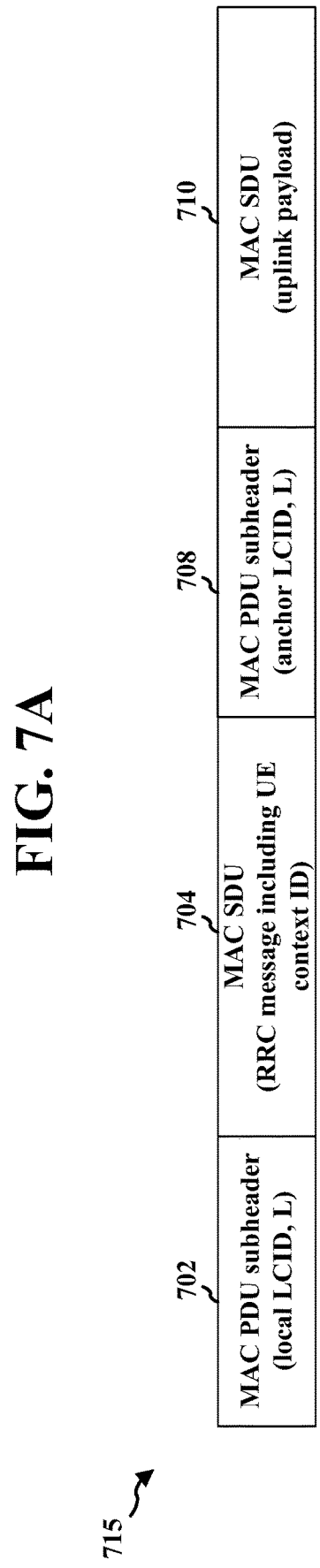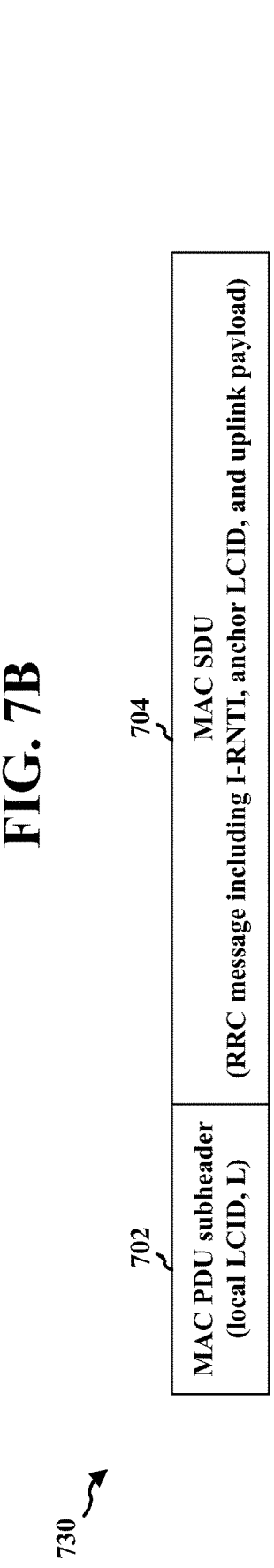
FIG. 7A
FIG. 7B
FIG. 7C

DATA TRANSFER BETWEEN AN INACTIVE MODE USER EQUIPMENT AND A WIRELESS NETWORK

CROSS-REFERENCE TO RELATED APPLICATION

This application is a National Phase of International Patent Application Serial No. PCT/CN2019/074301, entitled "DATA TRANSFER BETWEEN AN INACTIVE MODE USER EQUIPMENT AND A WIRELESS NETWORK", filed on Jan. 31, 2019, which claims the benefit of International Patent Application Serial No. PCT/CN2018/075191, entitled "Data Transfer Between an Inactive Mode User Equipment and a Wireless Network", filed on Feb. 3, 2018, which are expressly incorporated by reference herein in their entirety.

BACKGROUND

Technical Field

The present disclosure relates generally to communication systems, and more particularly, to enabling data transfer between an inactive mode user equipment (UE) and a network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In LTE, a UE may exchange data packets with the network after establishing an RRC connection with a serving base station. Evolved Universal Mobile Telecommunications System (UMTS) Terrestrial Radio Access Network (E-UTRAN) services, such as data packet transfer, radio channel ciphering and/or deciphering, integrity protection, header compression, etc., may be relayed between the network and the UE via the serving base station. The serving base station may maintain UE context information associated with the RRC connection (e.g., radio bearers) for the UE. The UE context may include UE state information (e.g., inactive mode, active mode, etc.), security information, UE capability information, and the identity of the UE-associated logical S1 connection. The UE context may be established when the UE transitions from inactive mode to active mode and an RRC connection is established with the serving base station.

Certain benefits, such as reduced overhead and reduced power consumption by the UE and/or serving base station, may be provided by 5G/NR if data packet exchange (e.g., inactive data transfer (IDT)) between an inactive mode UE and the network is enabled. However, because a logical channel and/or radio bearer through which data packets are processed may not exist when an inactive mode UE enters a new service area and a new RRC connection is not established, data packet exchange between the inactive mode UE and the network may not be feasible.

The present disclosure provides a solution by including an identifier (e.g., inactive radio network temporary identifier (I-RNTI), anchor logical channel identifier (LCID), a radio bearer identifier, resume identifier, radio area network (RAN) identifier, UE identifier, etc.) in each data packet associated with an inactive mode UE. Using the identifier included in a data packet, the serving base station may identify a corresponding anchor base station that maintains a UE context for the inactive mode UE, and forward the data packet to the corresponding anchor base station for processing. The anchor base station may process the data packet(s) using the UE context maintained for the corresponding inactive mode UE, and use the serving base station to relay data packets between the anchor base station and the inactive mode UE. Thus, the present disclosure may provide a mechanism by which data packet exchange between an inactive mode UE and the network may be enabled in order to reduce network overhead and reduce power consumption by the UE and/or serving base station.

In an aspect of the disclosure, a method, a computer-readable medium, and an apparatus are provided. In certain configurations, the apparatus may include an inactive mode UE. The apparatus may generate a packet including a first identifier associated with an anchor base station, a second identifier associated with a UE context, and a payload. The apparatus may transmit the packet to a serving base station.

In certain other configurations, the apparatus may include a serving base station. The apparatus may receive, from a UE, a first packet including a first identifier associated with an anchor base station, a second identifier associated with a UE context, and a payload. In certain aspects, the UE may be in RRC inactive mode. The apparatus may identify the anchor base station based at least in part on one or more of the first identifier associated with the anchor base station or the second identifier associated with the UE context. The apparatus may transmit a second packet to the anchor base station, the second packet including at least a portion of the first packet.

In certain other configurations, the apparatus may include an anchor base station. The apparatus may receive, from a serving base station, a first packet relayed from a UE in RRC inactive mode. In certain aspects, the first packet may include at least in part a first identifier associated with an anchor base station and a payload. The apparatus may identify a UE context associated with the UE based at least in part on the first identifier associated with the anchor base station. The apparatus may process the payload using the UE context.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A and 6B illustrates a data flow that may be used to enable data transfer between an inactive mode UE and a wireless network in accordance with certain aspects of the disclosure.

FIGS. 7A-7C illustrate various data packets that may be generated by an inactive mode UE in accordance with certain aspects of the disclosure.

DETAILED DESCRIPTION

Figure 1:
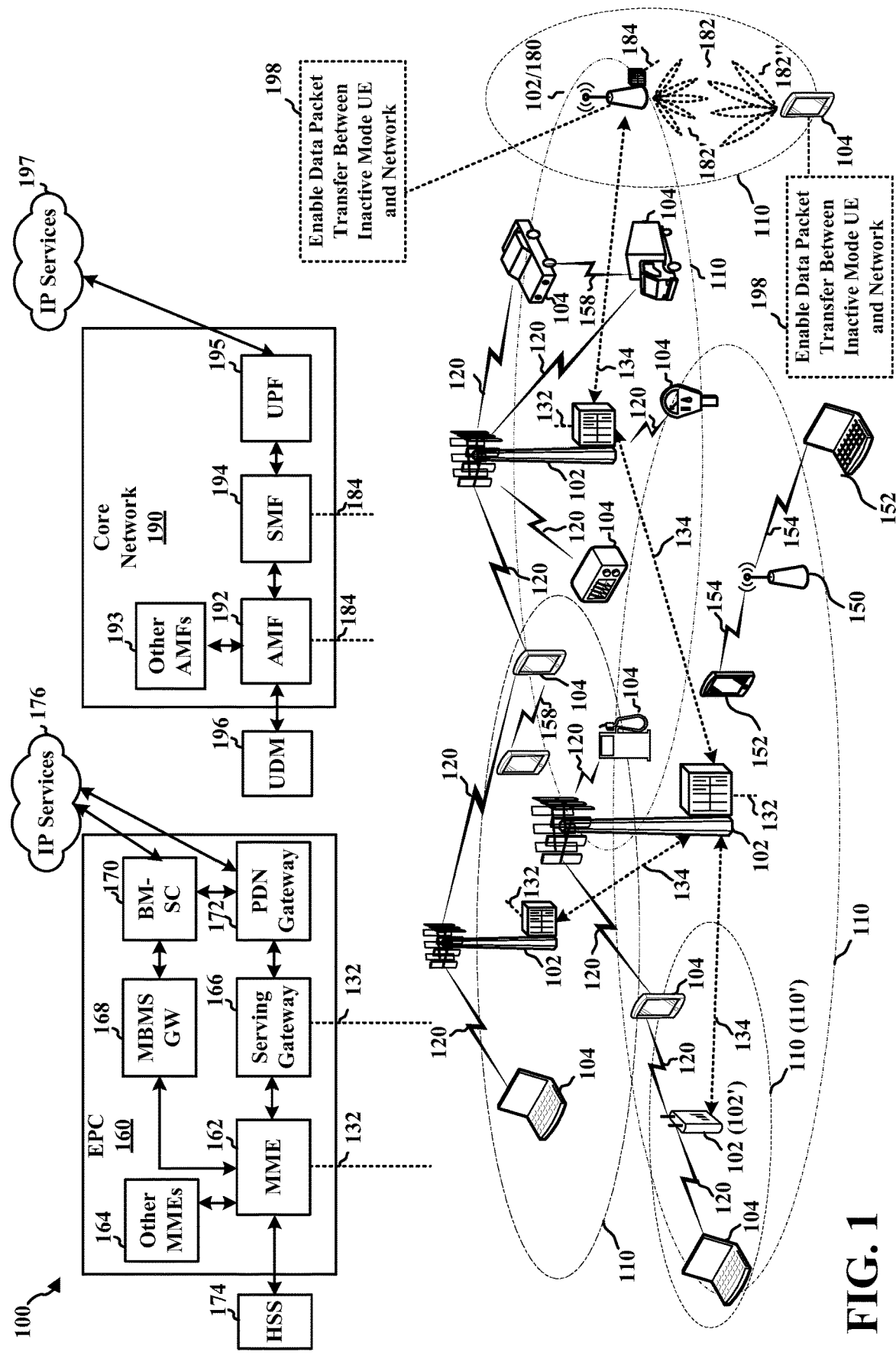
FIG. 1 is a diagram illustrating an example of a wireless communications system and an access network.
Figure 2:
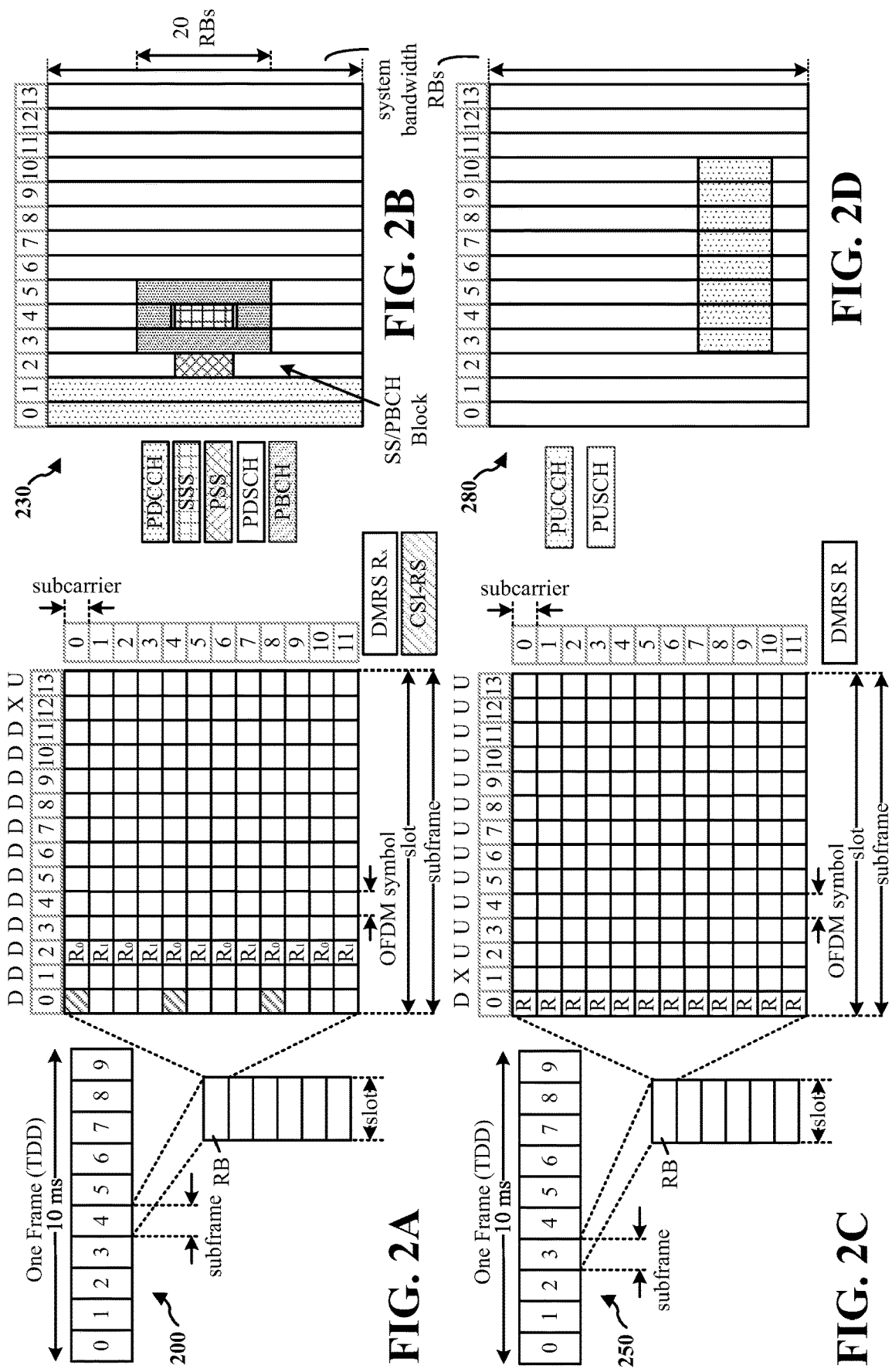
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. As used herein, the term computer-readable medium is expressly defined to include any type of computer readable storage device and/or storage disk and to exclude propagating signals and to exclude transmission media. As used herein, "computer-readable medium" and "machine-readable medium" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with the Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or the Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the base station 102/180 include a component 198 configured to support data transfer between a UE 104 in inactive mode and a network, for example, as described below in connection with any of FIGS. 2A-17.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A and 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3 and 4 are shown with slot formats 34 and 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots.

Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
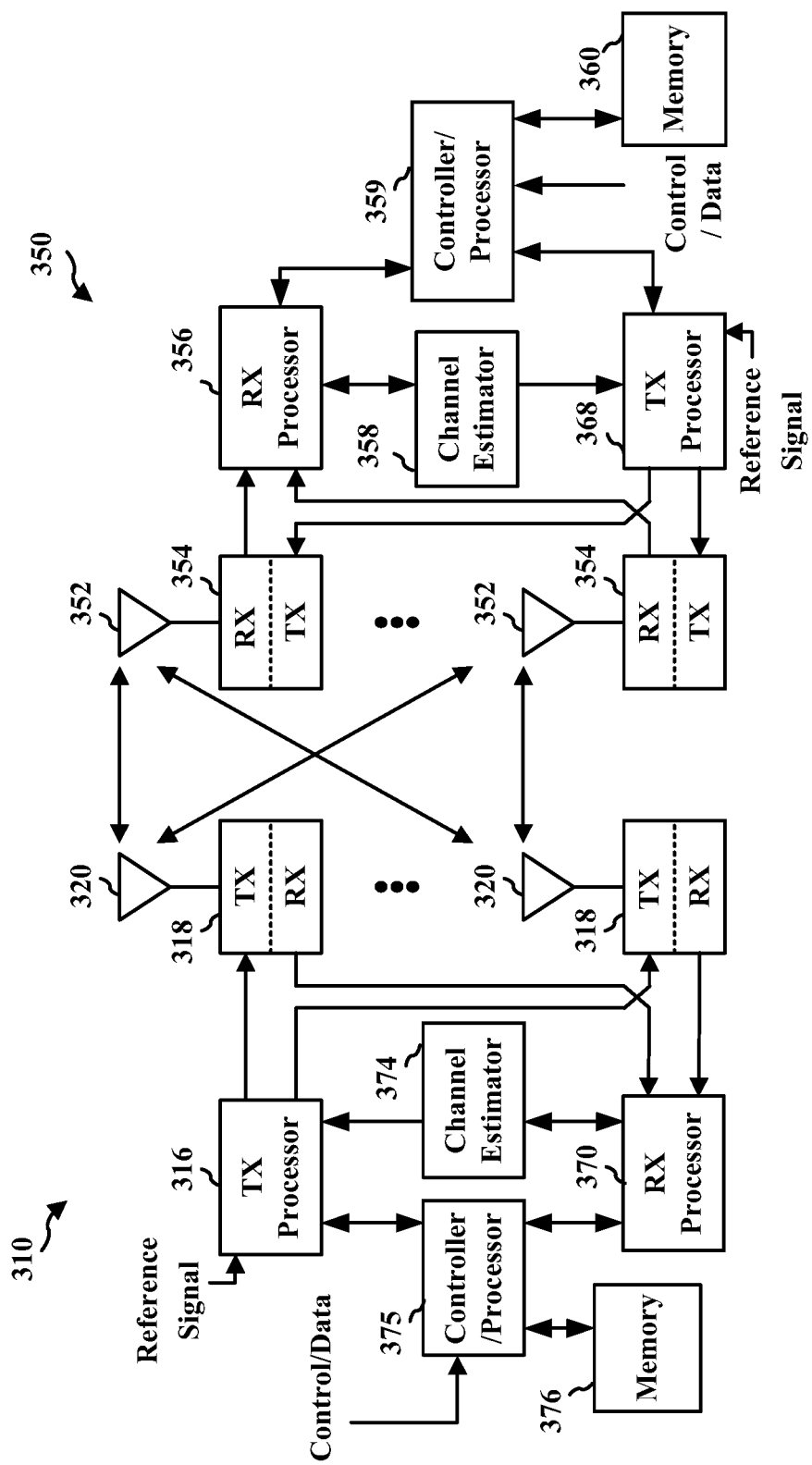
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
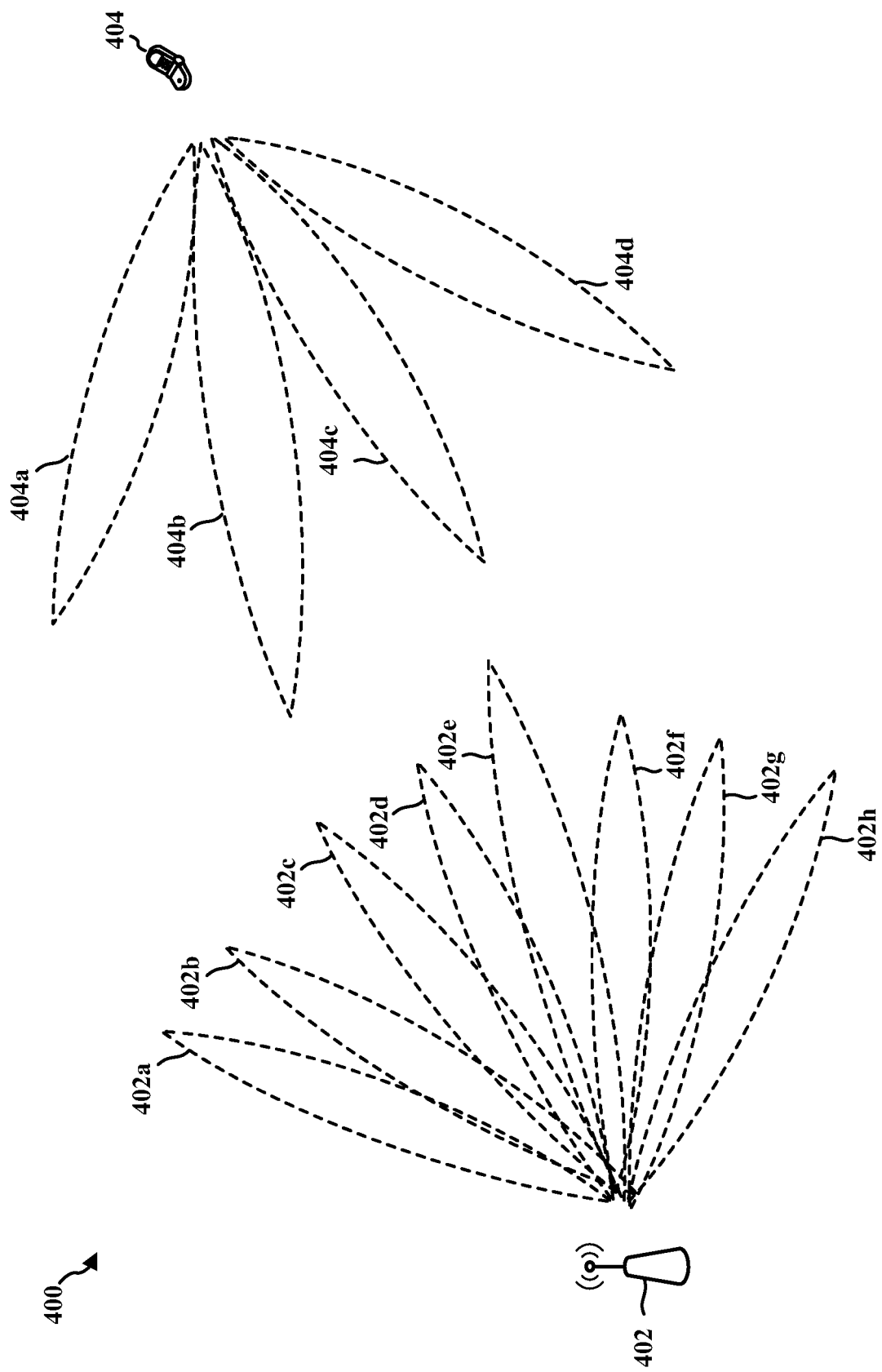
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5:
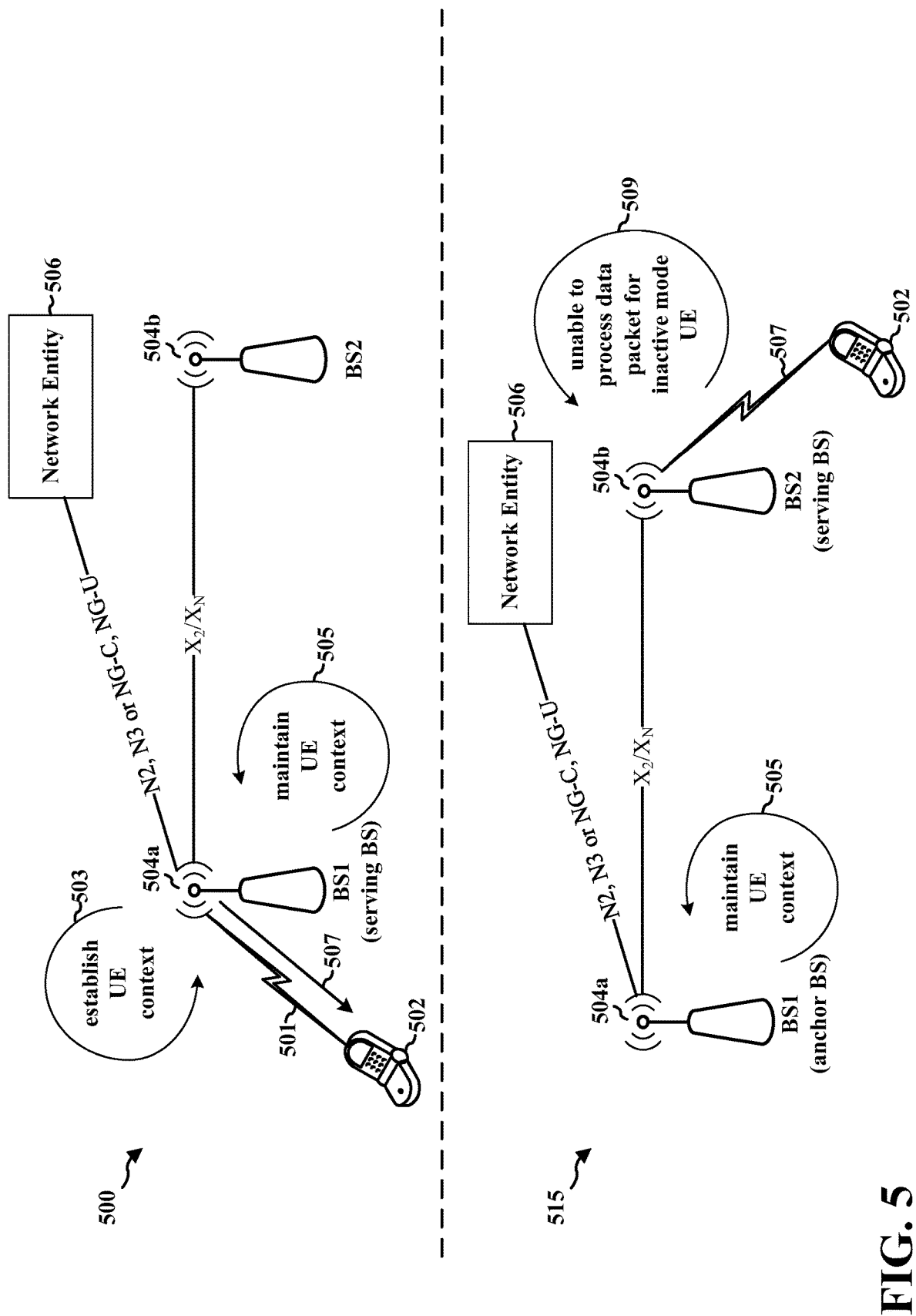
FIG. 5 is a diagram of a wireless communications system in accordance with certain aspects of the disclosure.

FIG. 5 illustrates diagrams 500, 515 depicting a UE 502 moving from the coverage area of a first base station 504a to a coverage area of a second base station 504b in accordance with certain aspects of the disclosure. The UE 502 may correspond to, e.g., UE 104, 350, 404, 602, 802, 1355, 1655, the apparatus 1002/1002'. The first base station 504a may correspond to, e.g., the base station 102, 180, 310, the anchor base station 604a, 804a, 1050, 1350, the apparatus 1602/1602'. The second base station 504b may correspond to, e.g., the base station 102, 180, 310, the serving base station 604b, 804b, 1055, 1650, the apparatus 1302/1302'. The network entity 506 may correspond to, e.g., network entity 162, 606, the other network entities 164.

In certain configurations, the UE 502 may exchange data packets with a wireless network after establishing (at 501) an RRC connection with the first base station 504a (e.g., the serving base station in diagram 500). Upon establishing (at 501) the RRC connection, the first base station 504a may establish (at 503) a UE context for the UE 502. The UE context may include UE state information (e.g., indicating that the UE is in an inactive mode, an active mode, etc.), security information, UE capability information, and/or the identity of the UE-associated logical connection (e.g., indicating that the UE associated logical connection is based on an N2, N3, NG-C (next generation control plane), and/or NG-U (next generation user plane) interface).

RAN (E-UTRAN or NG-RAN) services, such as data packet transfer, radio channel ciphering and/or deciphering, integrity protection, header compression, etc., may be relayed between the network entity 506 (e.g., MME, AMF entity, UPF entity, etc.) and the UE 502 via the first base station 504a using the maintained UE context 505 and the connection(s) (e.g., N2, N3 or NG-C, NG-U) to the network entity 506. When data packet exchange in either the uplink direction or the downlink direction does not occur for a preconfigured amount of time, the first base station 504a may send (at 507) a signal instructing the UE 502 to enter the inactive mode.

Certain benefits, such as reduced overhead and reduced power consumption by the UE and/or serving base station, may be provided if data packet exchange is enabled without the UE 502 transitioning to an active mode and establishing an RRC connection with a new serving base station (e.g., the second base station 504b) when the UE 502 leaves the coverage area of the first base station 504a and enters the coverage area of the second base station 504b, as shown in diagram 515.

When the UE 502 enters the coverage area of the second base station 504b, the UE 502 may remain in inactive mode by establishing (at 507) a connection with the second base station 504b using a random access procedure rather than an RRC connection setup procedure. However, because a logical channel and/or radio bearer through which data packets are processed (at 509) by the second base station 504b may not exist for the UE 502 inactive mode, data packet exchange between the UE 502 and the network entity 506 may not be feasible even when a connection (e.g., $X_2$, $X_N$, etc.) between the first base station 504a and the second base station 504b exists.

The present disclosure provides a solution by including an identifier (e.g., an I-RNTI, anchor LCD, a radio bearer identifier, resume identifier, and/or a RAN identifier, UE identifier, etc.) in each data packet associated with an inactive mode UE (e.g., UE 502). Using the identifier included in a data packet, the serving base station (e.g., the second base station 504b in diagram 515) may identify a corresponding anchor base station (e.g., first base station 504a in diagram 515) that maintains a UE context for the inactive mode UE (e.g., UE 502), and forward the data packet to the corresponding anchor base station.

The anchor base station may process the data packet(s) using the maintained UE context for the corresponding inactive mode UE, and use the serving base station to relay data packets between the anchor base station and the inactive mode UE. Thus, the present disclosure provides a mechanism by which IDT may be enabled in order to reduce network overhead and reduce power consumption by the UE and/or serving base station, as described below in connection with any of FIGS. 6A-17.

FIGS. 6A and 6B illustrates a data flow 600 that may be used to enable data transfer between a UE 602 that enters an inactive mode and a network entity 606 using a serving base station 604b and an anchor base station 604a in accordance with certain aspects of the disclosure. The UE 602 may correspond to, e.g., UE 104, 350, 404, 502, 802, 1355, 1655, the apparatus 1002/1002'. The anchor base station 604a may correspond to, e.g., the base station 102, 180, 310, the first base station 504a, the anchor base station 804a, 1050, 1350, the apparatus 1602/1602'. The serving base station 604b may correspond to, e.g., the base station 102, 180, 310, the second base station 504b, the serving base station 804b, 1055, 1650, the apparatus 1302/1302'. The network entity 606 may correspond to, e.g., network entity 162, 506, the other network entities 164. In FIGS. 6A and 6B, optional operations are indicated with dashed lines.

Referring to FIG. 6A, when the UE 602 is in active mode and within the coverage area of the anchor base station 604a, the UE 602 and the anchor base station 604a may perform (at 601) an RRC connection procedure to establish an RRC connection. For example, the UE 602 may initiate a session with the anchor base station 604a by sending a message that includes a random access radio network temporary identifier (RA-RNTI). The anchor base station 604a may assign a cell radio network temporary identifier (C-RNTI) and send timing adjustment information to the UE 602. The UE 602 may adjust the timing and send an RRC connection request using an uplink shared channel to the anchor base station 604a. The anchor base station 604a may send an RRC connection setup message to the UE 602 using a downlink shared channel, which establishes signaling radio bearers (SRBs) and/or data radio bearers (DRBs) for the UE 602. The UE 602 may acknowledge the RRC connection setup message by sending an RRC connection complete message to the anchor base station 604a.

When the RRC connection is established (at 601), the anchor base station 604a may maintain a UE context associated with the UE 602 in order to process data packets received from the UE 602 and/or the network entity 606. In order to support data transfer when the UE 602 enters inactive mode (e.g., IDT), the anchor base station 604a may send (at 603) information associated with a first identifier (e.g., anchor LCD, bearer ID, etc.) associated with the anchor base station 604a and a second identifier (e.g., I-RNTI, resume ID, RAN-ID, etc.) associated with the UE context to the UE 602. While in inactive mode, the UE 602 may include the anchor LCD and/or the I-RNTI in uplink packets in order to identify that the anchor base station 604a maintains the UE context information, and hence, indicate that any packets sent by the UE 602 may be relayed to the anchor base station 604a. Such information may be used by a new serving base station, e.g., when the UE 602 moves to a coverage area of a different base station so that the anchor base station 604a is no longer the serving base station for the UE 602.

When IDT between the UE 602 and the network entity 606 is supported, the network entity 606 may configure the RLC configuration that is used by the UE 602 to generate packets that are exchanged while in inactive mode. In certain configurations, the anchor base station 604a may be preconfigured with the RLC configuration information, and the anchor base station 604a may send (at 607) the RLC configuration information (e.g., that is preconfigured at the anchor base station 604a) to the UE 602. The RLC configuration information may be sent (at 607) using signaling and/or as system information. In certain configurations, the RLC information may be sent while the UE 602 is in active mode. The RLC information may be used by the UE 602 to determine an RLC configuration that is used when generating a data packet in inactive mode. Additionally and/or alternatively, the RLC configuration may be preconfigured at the UE 602.

In certain scenarios, the anchor base station 604a may determine (at 609) that data packet exchanges have not occurred for a predetermined time period (e.g., when a timer at the anchor base station 604a expires), and the anchor base station 604a may send a signal (at 611) instructing the UE 602 to enter inactive mode. The UE 602 may enter (at 613) the inactive mode upon receiving the signal 611. In other words, the UE 602 may transition from an active mode to an inactive mode. While in the inactive mode, UE 602 may be known to the EPC (e.g., the network entity 606) and maintain an IP address, however, the UE 602 may be unknown within the E-UTRAN and/or by certain base stations.

While in inactive mode, the UE 602 may receive broadcast or multicast data, monitor a paging channel to detect incoming calls, perform neighbor cell measurements, perform cell selection as well as reselection, and system information acquisition, just to name a few. Transitioning to inactive mode may reduce power consumption at the UE 602, as well as reduce system overhead.

In scenarios in which the UE 602 is in the inactive mode and moves from the coverage area of the anchor base station 604a to the coverage area of the serving base station 604b, the UE 602 and the serving base station 604b may perform (at 615) a random access procedure to form a communication link (e.g., without establishing radio bearers) with the serving base station 604b. In other words, when the communication link with the serving base station 604b is established, the UE 602 may not transition from inactive mode to active mode because an RRC connection procedure is not performed with the serving base station 604b in order to reduce power consumption and reduce network overhead.

While in the coverage area of the serving base station 604b, the UE 602 may generate (at 617) a packet that includes the first identifier associated with an anchor base station, the second identifier associated with the UE context, and a payload.

In a first implementation, the packet generated (at 617) by the UE 602 may include a subheader that includes the first identifier associated with the anchor base station, a SDU that includes the payload, and a control element (CE) that includes the second identifier associated with the UE context. Additional details associated with the first implementation of the data packet generated by the UE 602 are described below in connection with FIGS. 7A and 8C.

In a first aspect of the first implementation, the generated packet may include a medium access control (MAC) protocol data unit (PDU) and the CE may include a MAC CE. Additional details associated with the first aspect of the first implementation of the generated packet are described below in connection with FIG. 7A.

In a second aspect of the first implementation, the generated packet may include a packet data convergence protocol (PDCP) protocol data unit (PDU) and the CE may include a PDCP CE. Additional details associated with the first aspect of the first implementation are described below in connection with FIG. 8C.

In a second implementation, the packet generated (at 617) by the UE 602 may include a first SDU including an RRC message that carries the second identifier associated with the UE context, a first subheader that includes the first identifier associated with the anchor base station, and a second SDU that includes the payload. In certain aspects of the second implementation, the generated packet may also include a second subheader that includes a third identifier associated with the serving base station. When the packet includes a first SDU and a second SDU, the UE 602 may generate (at 617) the packet by multiplexing the first SDU and the second SDU. Additional details associated with the third implementation are described below in connection with FIG. 7B.

In a third implementation, the packet generated (at 617) by the UE 602 may include a SDU that includes an RRC message that carries the first identifier associated with the anchor base station, the second identifier associated with the UE, and the payload. In certain aspects of the third implementation, the generated packet generated may also include a subheader that includes a third identifier associated with the serving base station. Additional details associated with the third implementation are described below in connection with FIG. 7C.

In a fourth implementation, the packet generated (at 617) by the UE 602 may be generated at least in part on an RLC configuration. The RLC configuration may be based on the RLC configuration information received (at 607) from the anchor base station 604a, RLC configuration information received from the serving base station via system information, or based on an RLC configuration preconfigured (e.g., precoded) at the UE 602.

Upon generating the packet, the UE 602 (e.g., in inactive mode) may send (at 619) the packet to the serving base station 604b, and the serving base station 604b may identify (at 621) the anchor base station 604a (e.g., that maintains the UE context for the UE 602) based at least in part on one or more of the first identifier associated with the anchor base station or the second identifier associated with the UE context.

The serving base station 604b may determine IDT is used by the UE 802 based at least in part on using an indication bit in a MAC subheader that carries the anchor LCD, or using a separate subheader containing the local LCD. Otherwise, the serving base station 604b may determine IDT is used based on the presence of the UE context ID carried in the MAC CE of the MAC PDU. In certain configurations, the serving base station 604b may receive a MAC PDU from the UE 802 and send the MAC PDU to a PDCP entity and/or routing entity located at the serving base station 604b to generate a PDCP PDU (e.g., PDCP header, PDCP SDU, etc.) based on the received MAC PDU.

Once the anchor base station 604a is identified (at 621), the serving base station 604b may send (at 623) the packet (e.g., second packet—either MAC PDU or PDCP PDU) to the anchor base station 604a. The packet sent (at 623) by the serving base station 604b may include a third identifier associated with the serving base station 604b (e.g., temporary ID, local LCID, etc.). The anchor base station 604a may identify (at 625) the UE context associated with the UE 602 based at least in part on the first identifier associated with the anchor base station 604a, and process (at 627) the packet using the UE context maintained for the UE 602. The anchor base station 604a may transmit (at 629) the processed packet (e.g., third packet) to the network entity 606 using radio bearers established (at 601) during the RRC connection procedure with the UE 602. When a third identification associated with the serving base station 604b is include in the packet received by the anchor base station 604a, the anchor base station 604a may maintain the third identifier with the UE context information maintained for the UE 602 for future downlink data transfer.

In certain scenarios, the network entity 606 may send (at 631) a downlink packet that includes the identifier associated with the UE context for the UE 602 to the anchor base station 604a. The anchor base station 604a may identify the intended UE 602 based at least in part on the identifier associated with the UE context, and identify (at 633) the UE's 602 serving base station 604b based at least in part on the third identifier maintained with the UE context information for UE 602. The anchor base station 604a may send (at 635) the downlink packet to the serving base station 604b, which may send (at 637) the downlink packet to the UE 602.

Using the techniques described above in connection with FIGS. 6A and 6B, the present disclosure provides a mechanism by which IDT may be enabled in order to reduce network overhead and reduce power consumption by the UE 602 and/or serving base station 604b.

FIG. 7A is a diagram illustrating a MAC PDU 700 that may be generated by an inactive mode UE in accordance with certain aspects of the disclosure. The MAC PDU 700 may include the first implementation of the packet generated by the UE 602 described above in connection with FIG. 6A.

Referring to FIG. 7A, the MAC PDU 700 may include a MAC PDU subheader 702 that includes the anchor LCID (e.g., the first identifier described above in connection with FIGS. 6A and 6B) and length field "L" that indicates the data length corresponding to the MAC SDU 704, the MAC SDU 704 that includes the uplink payload, and a MAC CE 706 that includes the UE context ID (e.g., the second identifier described above in connection with FIGS. 6A and 6B).

FIG. 7B is a diagram illustrating a MAC PDU 715 that may be generated by an inactive mode UE in accordance with certain aspects of the disclosure. The MAC PDU 715 may include the second implementation of the packet generated by the UE 602 described above in connection with FIG. 6A.

Referring to FIG. 7B, the MAC PDU 700 may include a first MAC PDU subheader 702 that includes the local LCID (e.g., the third identifier described above in connection with FIGS. 6A and 6B), a first MAC SDU 704 that includes an RRC message carrying the UE context ID (e.g., the second identifier described above in connection with FIGS. 6A and 6B), a second MAC PDU subheader 708 that includes the anchor LCID (e.g., the first identifier described above in connection with FIGS. 6A and 6B), and a second MAC SDU 710 that includes the uplink payload. In certain configurations, the first MAC SDU 704 and the second MAC SDU 710 may be multiplexed.

FIG. 7C is a diagram illustrating a MAC PDU 730 that may be generated by an inactive mode UE in accordance with certain aspects of the disclosure. The MAC PDU 730 may include the third implementation of the packet generated by the UE 602 described above in connection with FIG. 6A.

Referring to FIG. 7C, the MAC PDU 730 may include a MAC PDU subheader 702 that includes the local LCID (e.g., the third identifier described above in connection with FIGS. 6A and 6B), and a MAC SDU 704 that includes an RRC message carrying the UE context ID (e.g., the second identifier described above in connection with FIGS. 6A and 6B), the anchor LCID (e.g., the first identifier described above in connection with FIGS. 6A and 6B), and the uplink payload.

Figure 8A:
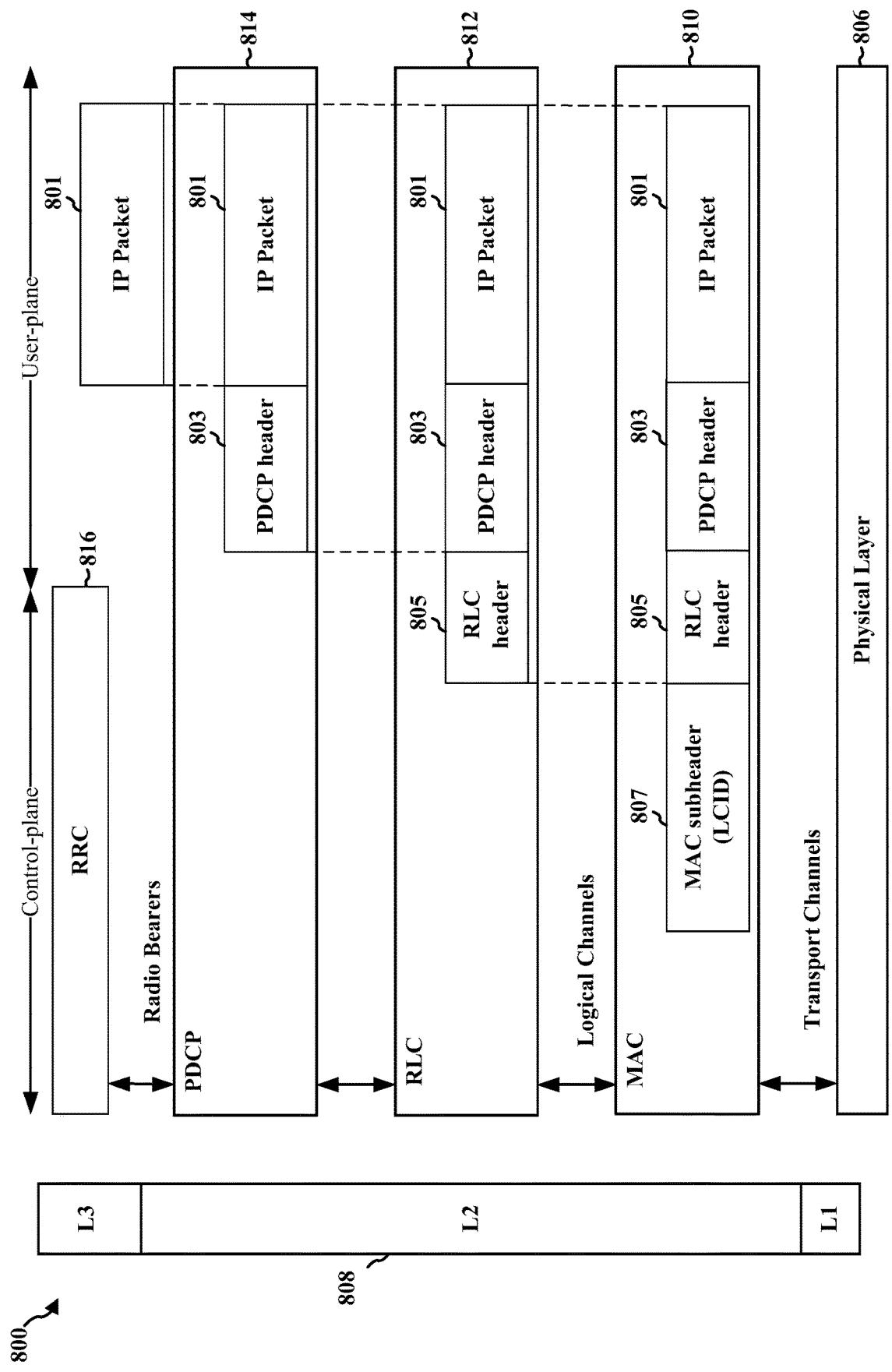
FIG. 8A is a diagram illustrating an example of a radio protocol architecture in accordance with certain aspects of the disclosure.

FIG. 8A is a diagram 800 illustrating an example of a radio protocol architecture in accordance with certain aspects of the disclosure. The radio protocol architecture for the UE and the base station is shown with three layers: Layer 1, Layer 2, and Layer 3. Layer 1 (L1 layer) is the lowest layer and implements various physical layer signal processing functions. The L1 layer will be referred to herein as the physical layer 806. Layer 2 (L2 layer) 808 is above the physical layer 806 and is responsible for the link between the UE and base station over the physical layer 806.

In the user plane, the L2 layer 808 includes a MAC sublayer 810, a RLC sublayer 812, and a PDCP sublayer 814, which are terminated at the base station on the network side. Although not shown, the UE may have several upper layers above the L2 layer 808 including a network layer (e.g., IP layer) that is terminated at the PDN gateway 172 on the network side, and an application layer that is terminated at the other end of the connection (e.g., far end UE, server, etc.).

The PDCP sublayer 814 provides multiplexing between different channels. The PDCP sublayer 814 also provides header compression for upper layer data packets to reduce radio transmission overhead, security by ciphering the data packets, and handover support for UEs between base stations. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

In the control plane, the radio protocol architecture for the UE and base station is substantially the same for the physical layer 806 and the L2 layer 808 with the exception that there is no header compression function for the control plane. The control plane also includes an RRC sublayer 816 in Layer 3 (L3 layer). The RRC sublayer 816 is responsible for obtaining radio resources (e.g., radio bearers) and for configuring the lower layers using RRC signaling between the base station and the UE.

An RRC inactive radio bearer may be associated with the RLC sublayer 812 at the serving base station that may be used for uplink data transfer for a UE in inactive mode (e.g., RRC inactive mode, RRC inactive state, etc.). In other words, an RRC inactive radio bearer configured at the serving base station (e.g., during the random access procedure performed (at 615) by the UE 602 in FIG. 6A) may not involve the RRC sublayer 816. The data packet sent from the UE to the serving base station, or from the serving base station to the anchor base station, may include an IP packet 801 that is passed to the PDCP sublayer 814. The PDCP sublayer 814 may append a PDCP header 803 to the IP packet 801. The PDCP sublayer 814 may pass the PDCP header 803 and the IP packet 801 to the RLC sublayer 812, which appends an RLC header 805. The RLC sublayer 812 may pass the RLC header 805, the PDCP header 803, and the IP packet 801 to the MAC sublayer 810, which appends a MAC subheader 807. The MAC subheader 807 may include an anchor LCID associated with a PDCP sublayer or entity (e.g., located at the anchor base station) that may process (e.g., ciphering/integrity protection) the packet (i.e., MAC PDU, PDCP PDU, etc.) and optionally the local LCID associated with the inactive radio bearer. In certain configurations, the presence of the UE context ID (e.g., resume ID, RAN-ID, etc.) in a MAC CE (not illustrated in FIG. 8A) may implicitly indicate to the serving base station that the packet is associated with the inactive radio bearer. Additionally and/or alternatively, a dedicated LCID (not illustrated in FIG. 8A) may explicitly indicate to the serving base station that the packet is associated with the inactive radio bearer. One or more bits in the MAC subheader 807 may be used to indicate the local LCID to the serving base station.

The inactive radio bearer may be associated with a routing entity (e.g., illustrated in FIGS. 8B-8G). If the serving base station is the anchor base station, the packet may be routed to the associated PDCP entity at the anchor base station.

Otherwise, when the serving base station is not the anchor base station, the packet may be routed to the anchor base station.

Figure 8B:
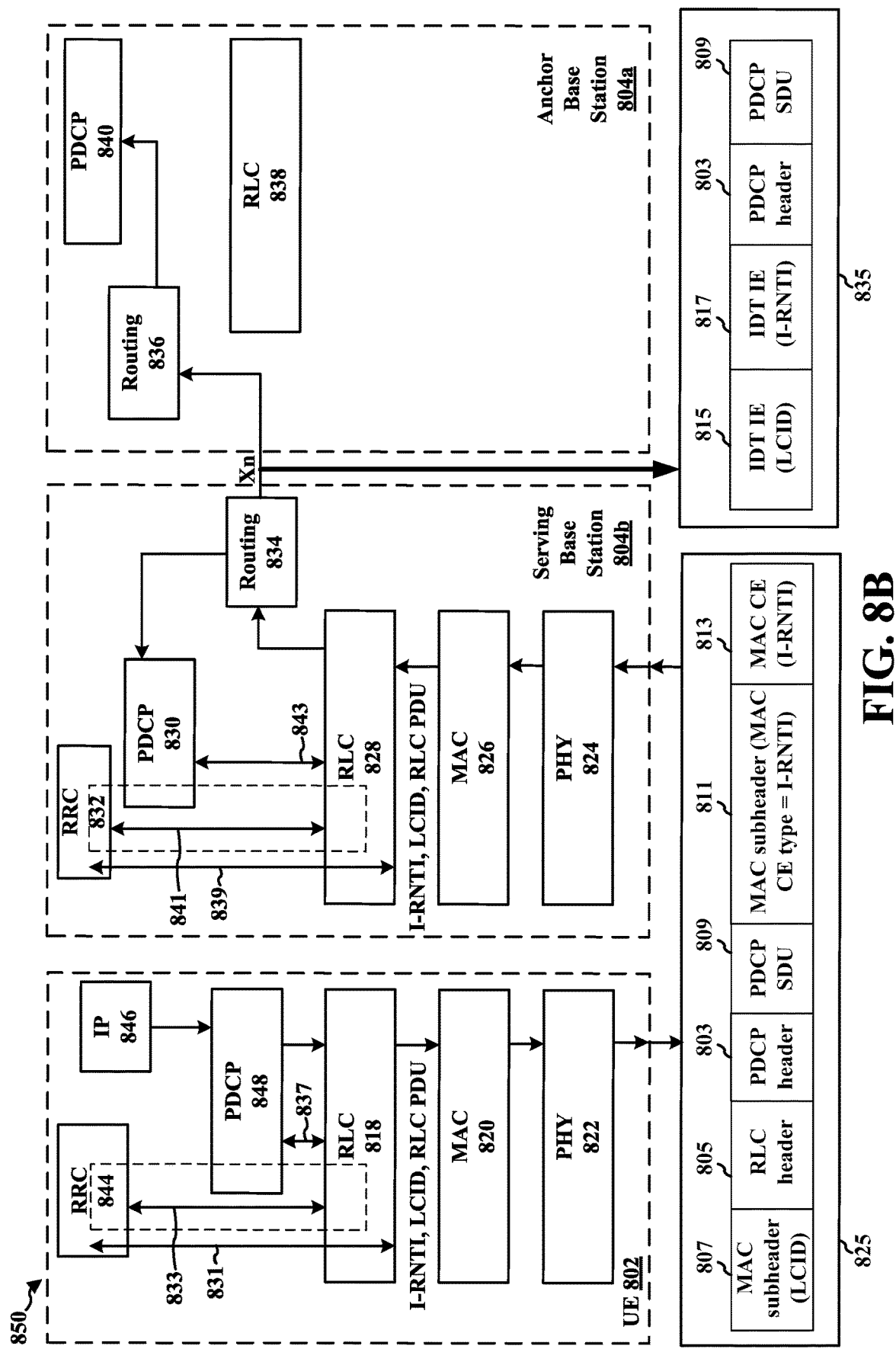
FIG. 8B is a diagram of a wireless communications system that may support data exchange between an inactive mode UE and a network in accordance with certain aspects of the disclosure.

FIG. 8B is a diagram of a wireless communications system 850 that may support data exchange between a UE 802 in inactive mode and an anchor base station 804a via a serving base station 804b in accordance with certain aspects of the disclosure. The UE 802 may correspond to, e.g., UE 104, 350, 404, 502, 602, 1355, 1655, the apparatus 1002/1002'. The anchor base station 804a may correspond to, e.g., the base station 102, 180, 310, the first base station 504a, the anchor base station 604a, 1050, 1350, the apparatus 1602/1602'. The serving base station 804b may correspond to, e.g., the base station 102, 180, 310, the second base station 504b, the serving base station 604b, 1055, 1650, the apparatus 1302/1302'.

Referring to FIG. 8B, the UE 802 may use a protocol stack that includes an RRC entity 844, an IP entity 846, a PDCP entity 848, an RLC entity 818, a MAC entity 820, and a physical (PHY) layer entity 822. The protocol stack at the UE 802 may include an SRB0 connection 831 and/or a SRB1/2 connection 833 between the RRC entity 844 and the RLC entity 818. The protocol stack at the UE 802 may also include a DRB$_i$ connection 837 between the PDCP entity 848 and the RLC entity 818.

The serving base station 804b may use a protocol stack that includes a routing entity 834, an RRC entity 832, a PDCP entity 830, an RLC entity 828, a MAC entity 826, and a PHY layer entity 824. The protocol stack at the serving base station 804b may include an SRB0 connection 839 and/or a SRB1/2 connection 841 between the RRC entity 832 and the RLC entity 828. The protocol stack at the serving base station 804b may also include a DRB$_i$ connection 843 between the PDCP entity 830 and the RLC entity 828.

The anchor base station 804a may use a protocol stack that includes a routing entity 836, an RLC entity 838, and a PDCP entity 840.

While in inactive mode, the UE 802 may generate a PDU (or packet) 825 using the techniques described above in connection with FIG. 8A. In certain configurations, the PDU 825 may include a MAC subheader 807 that includes the anchor LCID and optionally the local LCID, an RLC header 805, a PDCP header 803, a PDCP SDU 809, a MAC subheader 811 that includes a MAC CE type, and a MAC CE 813 that includes the UE context ID. The PHY layer entity 822 may send the PDU 825 to the PHY layer entity 824 at the serving base station 804b.

The serving base station 804b may determine that receiving the PDU 825 involves IDT based on the presence of UE context ID in MAC CE 813 or the local LCID in the MAC subheader 807. The local LCID may be assigned for an inactive radio bearer between the UE 802 and the serving base station 804b, or between the serving base station 804b and the anchor base station 804a. In certain configurations, the local LCID may include one or more bits in the MAC subheader 807.

When the serving base station 804b determines that the UE 802 uses IDT, the MAC entity 826 may configure an RLC configuration (if one does not already exists) for the inactive radio bearer, and provide the UE context ID, the anchor LCID, and/or RLC PDU to the RLC entity 828.

The anchor LCID may be used to locate the PDCP entity 840 at an anchor base station 804a that is associated with the UE 802 (e.g., that maintains the UE context for the UE 802). The RLC entity 828 may forward the UE context ID, anchor LCID and uplink packet (e.g., all or a portion of PDU 825) to the routing entity 834. The routing entity 834 may determine which anchor base station 804a maintains the UE context based on the anchor LCID. If the serving base station 804b is not the anchor base station (e.g., if the serving base station 804b is not associated with the anchor LCD), the routing entity 834 may forward the UE context ID, anchor LCID and a PDU 835 to routing entity 836 at the anchor base station 804a over an Xn connection.

The PDU 835 may include a first IDT IE 815 that includes the anchor LCD, a second IDT IE 817 that includes the UE context ID, the PDCP header 803, and the PDCP SDU 809 (e.g., the PDCP header 803 and/or the PDCP SDU 809 may include the uplink payload). The routing entity 836 at the anchor base station 804a may pass the PDU 835 to the PDCP entity 840 for processing using the maintained UE context.

Figure 8C:
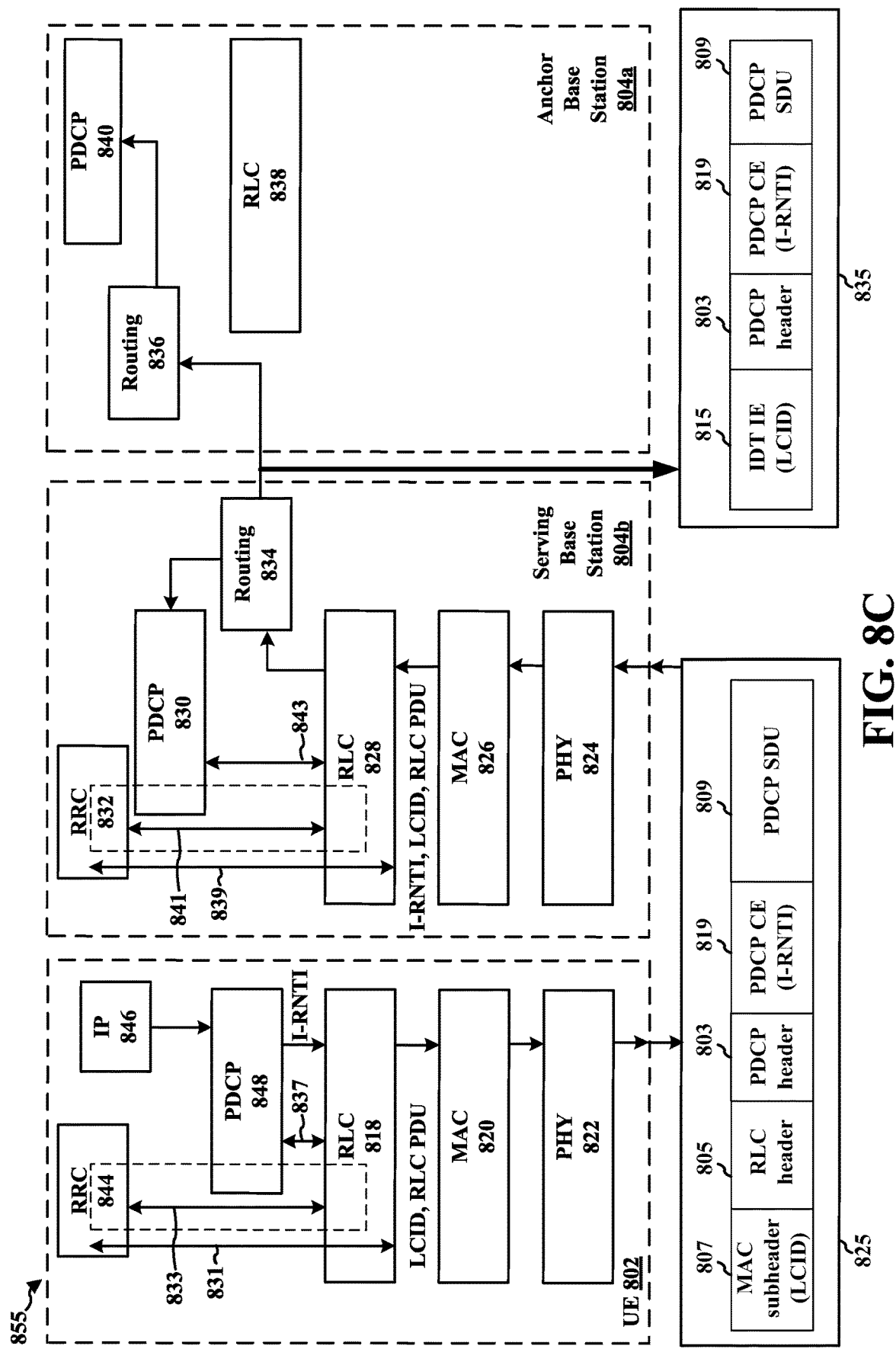
FIG. 8C is a diagram of a wireless communications system that may support data exchange between an inactive mode UE and a network in accordance with certain aspects of the disclosure.

FIG. 8C is a diagram of a wireless communications system 855 that may support data exchange between a UE 802 in inactive mode and an anchor base station 804a via a serving base station 804b in accordance with certain aspects of the disclosure. The UE 802 may correspond to, e.g., UE 104, 350, 404, 502, 602, 1355, 1655, the apparatus 1002/1002'. The anchor base station 804a may correspond to, e.g., the base station 102, 180, 310, the first base station 504a, the anchor base station 604a, 1050, 1350, the apparatus 1602/1602'. The serving base station 804b may correspond to, e.g., the base station 102, 180, 310, the second base station 504b, the serving base station 604b, 1055, 1650, the apparatus 1302/1302'.

FIG. 8C illustrates the same protocol stacks at the UE 802, serving base station 804b, and the anchor base station 804a as described above in connection with FIG. 8B.

While in inactive mode, the UE 802 may generate a PDU 825 using the techniques described above in connection with FIG. 8A. In certain configurations, the PDU 825 may include a MAC subheader 807 that includes the anchor LCID and optionally the local LCD, an RLC header 805, a PDCP header 803, a PDCP CE 819 that includes the UE context ID (e.g., I-RNTI), and a PDCP SDU 809. The PHY layer entity 822 may send the PDU 825 to the PHY layer entity 824 at the serving base station 804b.

The serving base station 804b may determine that receiving the PDU 825 involves IDT based on the presence of UE context ID in PDCP CE 819 or the local LCID in the MAC subheader 807. The local LCID may be assigned for an inactive radio bearer between the UE 802 and the serving base station 804b, or between the serving base station 804b and the anchor base station 804a. In certain configurations, the local LCID may include one or more bits in the MAC subheader 807.

When the serving base station 804b determines that the UE 802 uses IDT, the MAC entity 826 may provide the UE context ID, the anchor LCID, and/or RLC PDU to the RLC entity 828.

The anchor LCID may be used to locate the PDCP entity 840 at an anchor base station 804a that is associated with the UE 802 (e.g., that maintains the UE context for the UE 802). The RLC entity 828 may forward the UE context ID, anchor LCID and uplink packet (e.g., PDU 825) to the routing entity 834. The routing entity 834 may determine which anchor base station 804a maintains the UE context based on the anchor LCD. If the serving base station 804b is not the anchor base station (e.g., if the serving base station 804b is not associated with the anchor LCD), the routing entity 834 may forward the UE context ID, anchor LCID and a PDU 835 to routing entity 836 at the anchor base station 804a over the Xn connection.

The PDU 835 may include a first IDT IE 815 that includes the anchor LCD, the PDCP header 803, the PDCP CE 819 that includes the UE context ID (e.g., I-RNTI), and the PDCP SDU 809 (e.g., the PDCP header 803 and/or the PDCP SDU 809 may include the uplink payload). The routing entity 836 at the anchor base station 804*a* may pass the PDU 835 to the PDCP entity 840 for processing using the maintained UE context.

Figure 8D:
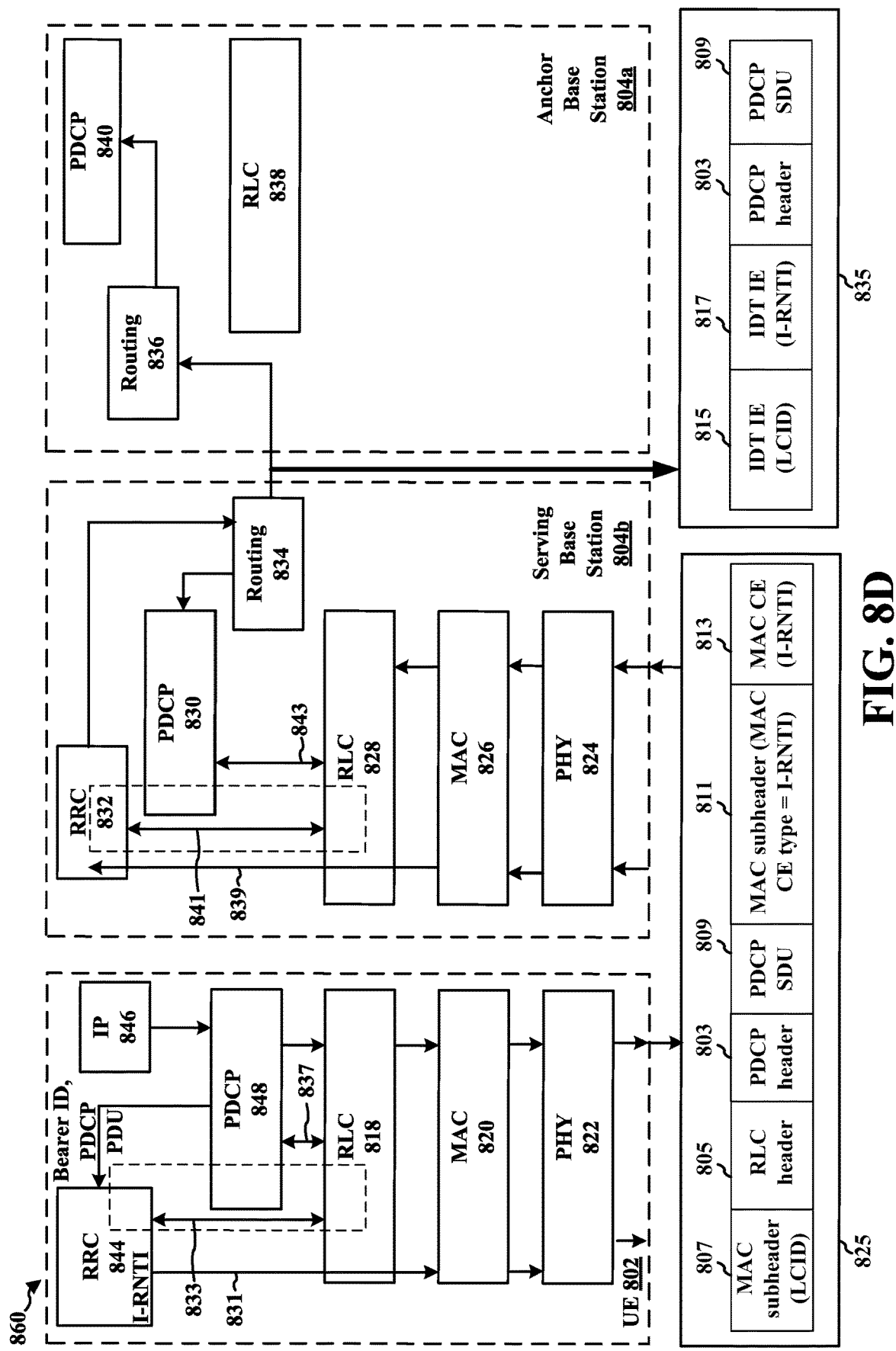
FIG. 8D is a diagram of a wireless communications system that may support data exchange between an inactive mode UE and a network in accordance with certain aspects of the disclosure.

FIG. 8D is a diagram of a wireless communications system 860 that may support data exchange between a UE 802 in inactive mode and an anchor base station 804*a* via a serving base station 804*b* in accordance with certain aspects of the disclosure. The UE 802 may correspond to, e.g., UE 104, 350, 404, 502, 602, 1355, 1655, the apparatus 1002/1002'. The anchor base station 804*a* may correspond to, e.g., the base station 102, 180, 310, the first base station 504*a*, the anchor base station 604*a*, 1050, 1350, the apparatus 1602/1602'. The serving base station 804*b* may correspond to, e.g., the base station 102, 180, 310, the second base station 504*b*, the serving base station 604*b*, 1055, 1650, the apparatus 1302/1302'.

FIG. 8D illustrates the same protocol stacks at the UE 802, serving base station 804*b*, and the anchor base station 804*a* as described above in connection with FIGS. 8B and 8C.

While in inactive mode, the UE 802 may generate a PDU 825 using the techniques described above in connection with FIG. 8A and by generating an RRC message for IDT (e.g., namely data over RRC). The IDT RRC message may include the UE context ID, anchor LCD, local LCD, and the data where the data is the PDU 825. In certain configurations, the anchor LCID (e.g., the bearer ID) and PDCP PDU may be provided to the RRC entity 844 by the PDCP entity 848. The UE context ID may be added to the RRC message by the RRC entity 844. The RRC message may be sent from the RRC entity 844 to the RLC entity either by the SRB0 connection 831 (e.g., which may change the size of the RRC message) and/or the SRB1/2 connection 833 (e.g., the RRC message may be sent after message5).

In certain configurations, the PDU 825 may include a MAC subheader 807 that includes the anchor LCID and optionally the local LCD, an RLC header 805, a PDCP header 803, a PDCP SDU 809, a MAC subheader 811 that indicates a MAC CE type, and a MAC CE 813 that includes the UE context ID. The PHY layer entity 822 may send the PDU 825 to the PHY layer entity 824 at the serving base station 804*b*.

The PDU 825 may be sent to the RRC entity 832, and the RRC entity may retrieve the PDCP PDU from the PDU 825. The RRC entity 832 may send the retrieved PDCP PDU to the routing entity 834, which then determines if the PDCP PDU should be transferred to another base station (e.g., anchor base station 604*a*) or the PDCP entity 830 based at least in part on the UE context ID and/or anchor LCD.

When the serving base station 804*b* determines that the UE 802 uses IDT, the MAC entity 826 may configure an RLC configuration (if one does not already exists) for the inactive radio bearer, and provide the UE context ID, the anchor LCD, and/or RLC PDU to the RLC entity 828. The RLC entity 828 may send the UE context ID, the anchor LCD, and/or PDCP PDU to the PDCP entity 830, which passes the information to the RRC entity 832.

The RRC entity 832 may determine that IDT is used by the UE 802, and send the anchor LCD, UE context ID, and PDCP PDU to the routing entity 834. If the serving base station 804*b* is not the anchor base station (e.g., if the serving base station 804*b* is not associated with the anchor LCD), the routing entity 834 may forward the UE context ID, anchor LCD and a PDU 835 to routing entity 836 at the anchor base station 804*a* over the Xn connection.

The PDU 835 may include a first IDT IE 815 that includes the anchor LCD, a second IDT IE 817 that includes the UE context ID, the PDCP header 803, and the PDCP SDU 809 (e.g., the PDCP header 803 and/or the PDCP SDU 809 may include the uplink payload). The routing entity 836 at the anchor base station 804*a* may pass the PDU 835 to the PDCP entity 840 for processing using the maintained UE context.

Figure 8E:
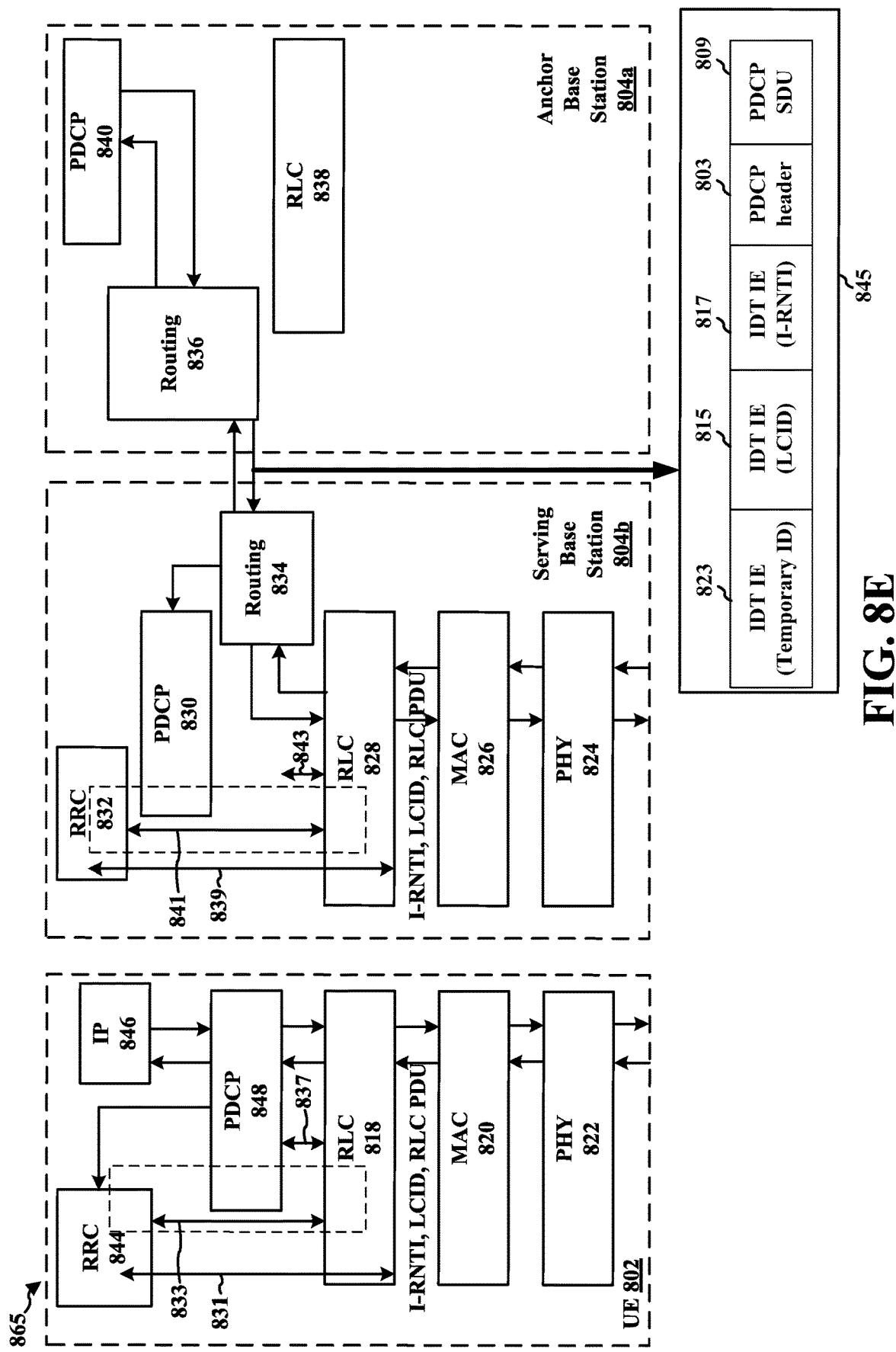
FIG. 8E is a diagram of a wireless communications system that may support data exchange between an inactive mode UE and a network in accordance with certain aspects of the disclosure.

FIG. 8E is a diagram of a wireless communications system 865 that may support data exchange between a UE 802 in inactive mode and an anchor base station 804*a* via a serving base station 804*b* in accordance with certain aspects of the disclosure. The UE 802 may correspond to, e.g., UE 104, 350, 404, 502, 602, 1355, 1655, the apparatus 1002/1002'. The anchor base station 804*a* may correspond to, e.g., the base station 102, 180, 310, the first base station 504*a*, the anchor base station 604*a*, 1050, 1350, the apparatus 1602/1602'. The serving base station 804*b* may correspond to, e.g., the base station 102, 180, 310, the second base station 504*b*, the serving base station 604*b*, 1055, 1650, the apparatus 1302/1302'.

FIG. 8E illustrates the same protocol stacks at the UE 802, serving base station 804*b*, and the anchor base station 804*a* as described above in connection with FIGS. 8B-8D. The UE 802, serving base station 804*b*, and anchor base station 804*a* may use the same or similar techniques to perform inactive data transfer between the UE 802 and the anchor base station 804*a* as described above in connection with any of FIG. 8B or 8C.

When the serving base station 804*b* sends the PDU 835 (described above in connection with FIGS. 8B and 8C) to the anchor base station 804*a*, the serving base station 804*b* may include a temporary ID (TEID) (e.g., C-RNTI, etc.) associated with the UE 802 so that the anchor base station 804*a* may determine the coverage area in which the UE 802 is located. The temporary ID may be used by the anchor base station 804*a* identify which serving base station 804*b* to send a downlink data packet 845 for the UE 802.

The downlink data packet 845 may include a first IDT IE 823 that includes the TEID, a second IDT IE 815 that includes the anchor LCID, a third IDT IE 817 that includes the UE context ID, a PDCP header 803, and a PDCP SDU 809. The PDCP header 803 and/or PDCP SDU 809 may include the downlink payload. The PDCP entity 840 may send the downlink data packet 845 to the routing entity 836. The routing entity 836 at the anchor base station 804*a* may send the downlink data packet 845 to the routing entity 834 at the serving base station 804*b*. The downlink data packet 845 may be passed down through the protocol stack at the serving base station 804*b*, and the PHY layer entity 824 may send the downlink data packet 845 to the PHY layer entity 822 at the UE 802.

The downlink data packet 845 may be passed up the protocol stack at the UE 802 to the PDCP entity 848, which processes the downlink data packet 845.

Figure 8F:
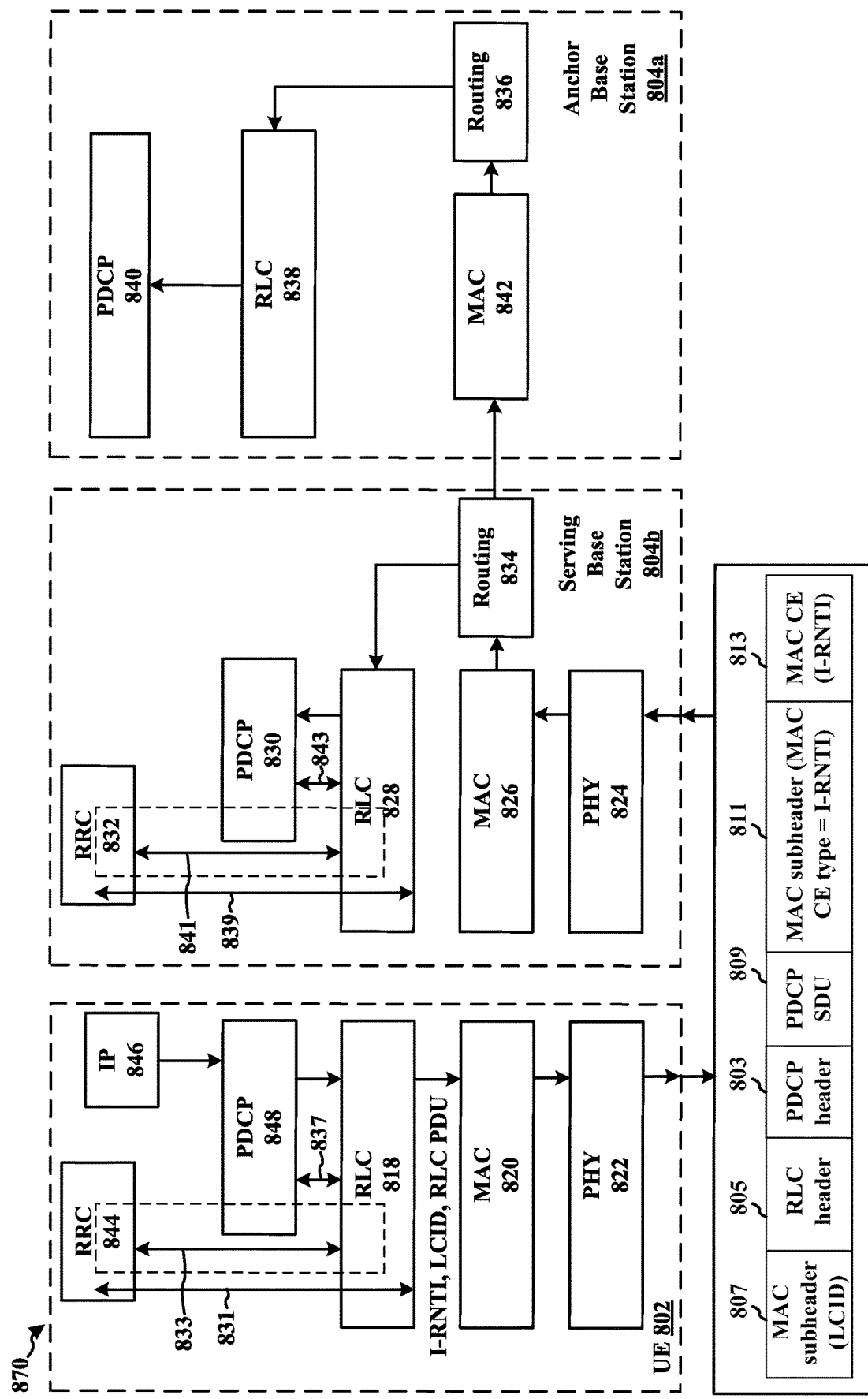
FIG. 8F is a diagram of a wireless communications system that may support data exchange between an inactive mode UE and a network in accordance with certain aspects of the disclosure.

FIG. 8F is a diagram of a wireless communications system 870 that may support data exchange between a UE 802 in inactive mode and an anchor base station 804*a* via a serving base station 804*b* in accordance with certain aspects of the disclosure. The UE 802 may correspond to, e.g., UE 104, 350, 404, 502, 602, 1355, 1655, the apparatus 1002/1002'. The anchor base station 804*a* may correspond to, e.g., the base station 102, 180, 310, the first base station 504*a*, the anchor base station 604*a*, 1050, 1350, the apparatus 1602/

1602'. The serving base station 804b may correspond to, e.g., the base station 102, 180, 310, the second base station 504b, the serving base station 604b, 1055, 1650, the apparatus 1302/1302'.

FIG. 8F illustrates the same protocol stacks at the UE 802, serving base station 804b, and the anchor base station 804a as described above in connection with FIGS. 8B-8E.

While in inactive mode, the UE 802 may generate a MAC PDU 880 using the techniques described above in connection with FIG. 8A. In certain configurations, the MAC PDU 880 may include a MAC subheader 807 that includes the anchor LCID and optionally the local LCD, an RLC header 805, a PDCP header 803, a PDCP SDU 809, a MAC subheader 811 that indicates a MAC CE type, and a MAC CE 813 that includes the UE context D. The PHY layer entity 822 may send the MAC PDU 880 to the PHY layer entity 824 at the serving base station 804b.

The serving base station 804b may determine that receiving the MAC PDU 880 involves IDT based on the presence of UE context ID in the MAC CE 813 or the local LCID in the MAC subheader 807. The local LCID may be assigned for an inactive radio bearer between the UE 802 and the serving base station 804b, or between the serving base station 804b and the anchor base station 804a. In certain configurations, the local LCID may include one or more bits in the MAC subheader 807.

When the serving base station 804b determines that the UE 802 uses IDT and that the serving base station 804b is not the anchor base station, the MAC entity 826 may send the MAC PDU 880 to the routing entity 834.

The anchor LCID may be used to locate the PDCP entity 840 at an anchor base station 804a that is associated with the UE 802 (e.g., that maintains the UE context for the UE 802). The routing entity 834 may determine which anchor base station 804a maintains the UE context based on the anchor LCID, and forward the UE context ID, anchor LCID and a PDU (e.g., either the entire MAC PDU 880 or a portion of the MAC PDU 880) to the MAC entity 842 at the anchor base station 804a over the Xn connection.

The MAC entity 842 may send the received MAC PDU to the routing entity 836 at the anchor base station 804a, which may pass the received MAC PDU to the PDCP entity 840 for processing using the maintained UE context.

Figure 8G:
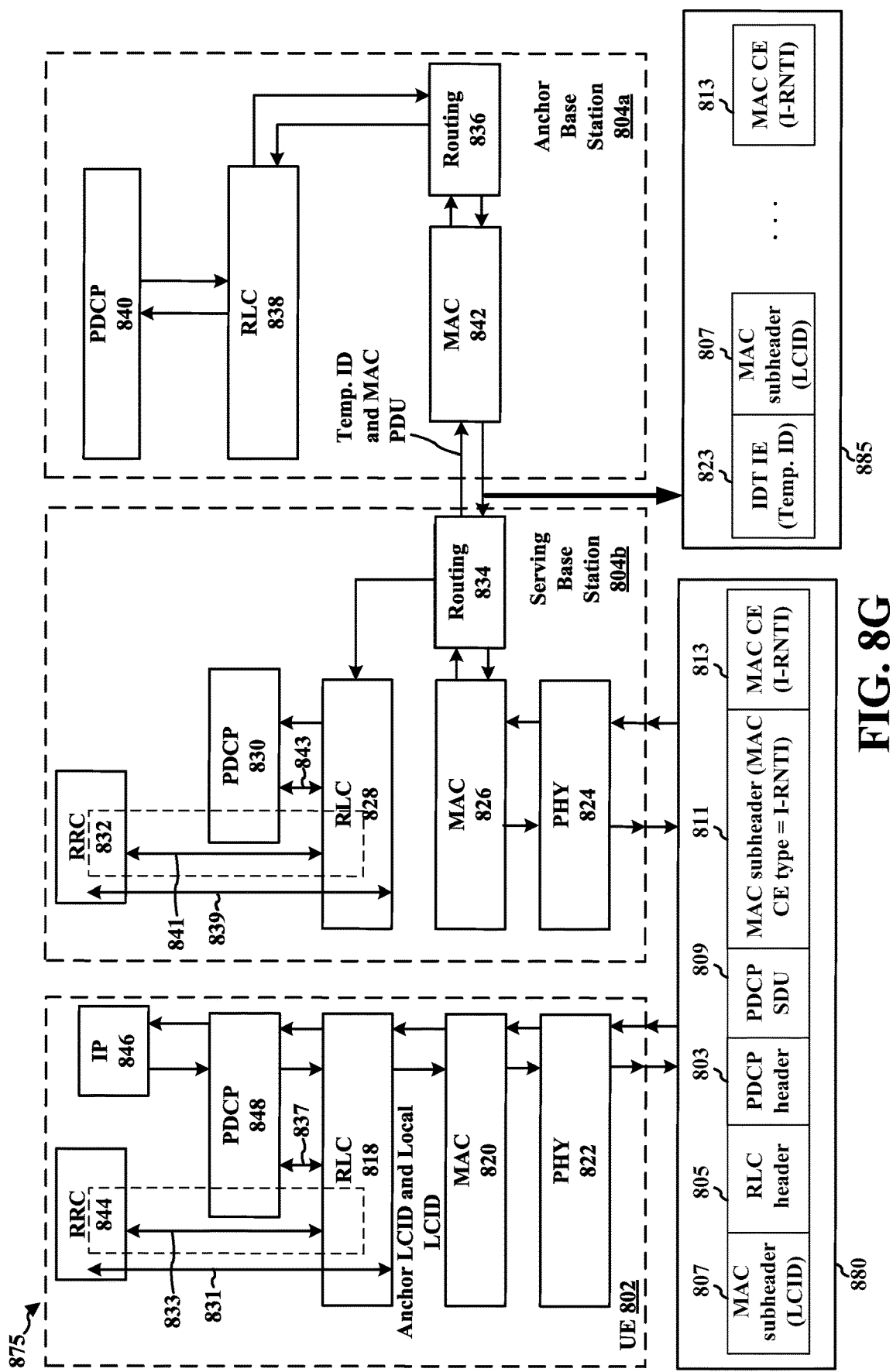
FIG. 8G is a diagram of a wireless communications system that may support data exchange between an inactive mode UE and a network in accordance with certain aspects of the disclosure.

FIG. 8G is a diagram of a wireless communications system 875 that may support data exchange between a UE 802 in inactive mode and an anchor base station 804a via a serving base station 804b in accordance with certain aspects of the disclosure. The UE 802 may correspond to, e.g., UE 104, 350, 404, 502, 602, 1355, 1655, the apparatus 1002/1002'. The anchor base station 804a may correspond to, e.g., the base station 102, 180, 310, the first base station 504a, the anchor base station 604a, 1050, 1350, the apparatus 1602/1602'. The serving base station 804b may correspond to, e.g., the base station 102, 180, 310, the second base station 504b, the serving base station 604b, 1055, 1650, the apparatus 1302/1302'.

FIG. 8G illustrates the same protocol stacks at the UE 802, serving base station 804b, and the anchor base station 804a as described above in connection with FIGS. 8B-8E.

While in inactive mode, the UE 802 may generate a MAC PDU 880 using the techniques described above in connection with the protocol stack of FIG. 8A. In certain configurations, the MAC PDU 880 may include a MAC subheader 807 that includes the anchor LCID and optionally the local LCD, an RLC header 805, a PDCP header 803, a PDCP SDU 809, a MAC subheader 811 that indicates a MAC CE type, and a MAC CE 813 that includes the UE context ID. The PHY layer entity 822 may send the MAC PDU 880 to the PHY layer entity 824 at the serving base station 804b.

The serving base station 804b may determine that receiving the MAC PDU 880 involves IDT based on the presence of UE context ID in MAC CE 813 or the local LCID in the MAC subheader 807. The local LCID may be assigned for an inactive radio bearer between the UE 802 and the serving base station 804b, or between the serving base station 804b and the anchor base station 804a. In certain configurations, the local LCID may include one or more bits in the MAC subheader 807.

When the serving base station 804b determines that the UE 802 uses IDT and that the serving base station 804b is not the anchor base station, the MAC entity 826 may send the MAC PDU 880 to the routing entity 834.

The anchor LCID may be used to locate the PDCP entity 840 at an anchor base station 804a that is associated with the UE 802 (e.g., that maintains the UE context for the UE 802). The routing entity 834 may determine which anchor base station 804a maintains the UE context based on the anchor LCID, and forward the UE context ID, anchor LCD, a temporary ID (e.g., associated with the serving base station 804b and/or UE 802), and a PDU (e.g., either the entire MAC PDU 880 or a portion of the MAC PDU 880) to the MAC entity 842 at the anchor base station 804a over the Xn connection. The temporary ID may be used by the anchor base station 804a to identify which serving base station 804b is currently serving the UE 802.

The MAC entity 842 may send the received MAC PDU to the routing entity 836 at the anchor base station 804a, which may pass the received MAC PDU to the PDCP entity 840 for processing using the maintained UE context.

For downlink IDT, the anchor base station 804a may generate a MAC PDU 885 based on a default configuration (e.g., transport block size) for IDT. The downlink MAC PDU 885 may carry the MAC CE 813 that includes the UE context ID. In certain other configurations, the MAC PDU 885 may not carry the MAC CE 813 that includes the UE context ID. In order to achieve a preconfigured TB size, the serving base station 804b may reconstruct the MAC PDU 885 prior to forwarding the UE 802.

In certain implementations, the anchor base station 804a may generate a MAC SDU for a downlink IDT rather than a MAC PDU, and the serving base station 804b may generate the MAC PDU 885 based on the received MAC SDU. The serving base station 804b may forward the generated MAC PDU to the UE 802.

Figure 9:
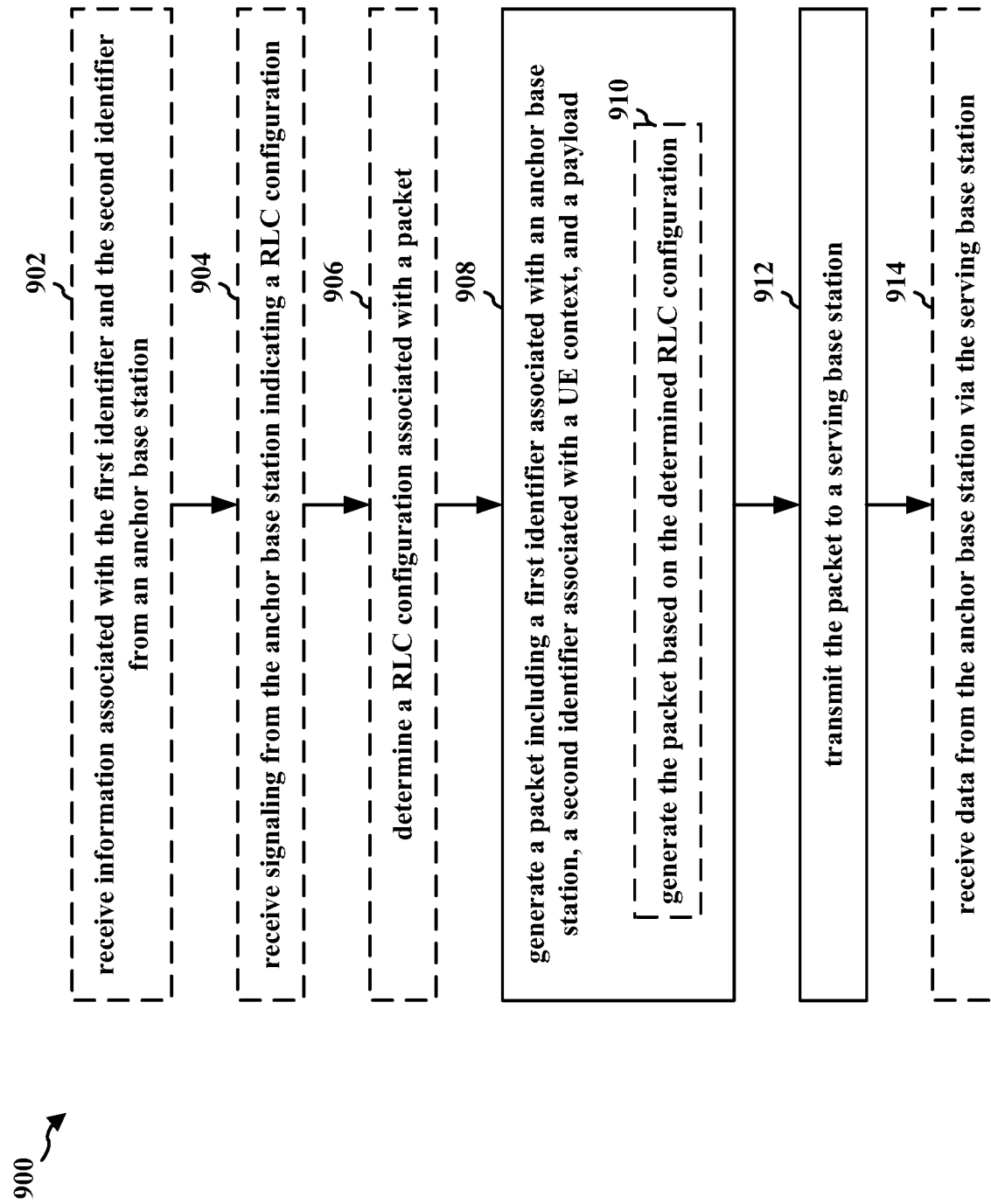
FIG. 9 is a flowchart of a method of wireless communication.

FIG. 9 is a flowchart 900 of a method of wireless communication. The method may be performed by an inactive mode UE (e.g., the UE 104, 350, 404, 502, 602, 802, 1355, 1655, the apparatus 1002/1002'). In FIG. 9, optional operations are indicated with dashed lines. The method may improve communication between a UE in an inactive mode and a network. Aspects may reduce network overhead and improve the efficiency of the communication and power use at the UE.

At 902, the UE may receive information associated with a first identifier and a second identifier from an anchor base station. For example, referring to FIG. 6A, in order to support data transfer when the UE 602 enters inactive mode (e.g., IDT), the anchor base station 604a may send (at 603) information associated with a first identifier (e.g., anchor LCID, bearer ID, etc.) associated with the anchor base station 604a and a second identifier (e.g., I-RNTI, resume ID, RAN-ID, etc.) associated with the UE context to the UE 602.

At 904, the UE may receive signaling from the anchor base station indicating the RLC configuration. In certain aspects, the signaling includes system information. For example, referring to FIG. 6A, the anchor base station 604a may send (at 607) the RLC configuration information to the UE 602. The RLC configuration information may be sent (at 607) using signaling and/or as system information.

At 906, the UE may determine an RLC configuration associated with the packet. In certain aspects, the RLC configuration is preconfigured at the UE. In certain other aspects, the RLC configuration is determined based on the signaling. For example, referring to FIG. 6A, the RLC information may be used by the UE 602 to determine an RLC configuration that is used when generating a data packet in inactive mode.

At 908, the UE may generate a packet including a first identifier associated with an anchor base station, a second identifier associated with a UE context, and a payload. In certain aspects, the second identifier associated with the UE context includes an I-RNTI. For example, referring to FIG. 6A, the UE 602 may generate (at 617) a packet that includes the first identifier associated with an anchor base station, the second identifier associated with the UE context, and a payload.

In a first implementation, the packet may include a subheader that includes the first identifier associated with the anchor base station, a SDU that includes the payload, and a CE that includes the second identifier associated with the UE context. Additional details associated with the first implementation of the data packet generated by the UE 602 are described above in connection with FIGS. 7A and 8C.

In a first aspect of the first implementation, the packet may include a MAC PDU and the CE may include a MAC CE. Additional details associated with the first aspect of the first implementation of the generated packet are described above in connection with FIG. 7A.

In a second aspect of the first implementation, the packet may include a PDCP PDU and the CE may include a PDCP CE. Additional details associated with the first aspect of the first implementation are described above in connection with FIG. 8C.

In a second implementation, the packet may include a first SDU including an RRC message that carries the second identifier associated with the UE context, a first subheader that includes the first identifier associated with the anchor base station, and a second SDU that includes the payload. In certain aspects of the second implementation, the generated packet may also include a second subheader that includes a third identifier associated with the serving base station. In certain other aspects of the second implementation, the first SDU and the second SDU may be multiplexed. Additional details associated with the second implementation are described above in connection with FIG. 7B.

In a third implementation, the packet may include a SDU that includes an RRC message that carries the first identifier associated with the anchor base station, the second identifier associated with the UE, and the payload. In certain aspects of the second implementation, the generated packet generated may also include a subheader that includes a third identifier associated with the serving base station. Additional details associated with the third implementation are described above in connection with FIG. 7C.

At 910, the UE may generate the packet including the first identifier associated with the anchor base station, the second identifier associated with the UE context, and the payload by generating the packet based on the determined RLC configuration. For example, referring to FIG. 6A, the RLC configuration may be based on the RLC configuration information received (at 607) from the anchor base station 604a, or based on an RLC configuration preconfigured (e.g., precoded) at the UE 602.

At 912, the UE may transmit the packet to the serving base station. In certain aspects, the anchor base station and the serving base station may be different base stations. In certain other aspects, the anchor base station and the serving base station may be the same base station. Referring to FIG. 6A, the UE 602 (e.g., in inactive mode) may send (at 619) the packet to the serving base station 604b.

At 914, the UE may receive data from the anchor base station via the serving base station. In certain aspects, the data may include one or more of the first identifier associated with an anchor base station, the second identifier associated with the UE context, or a third identifier associated with the serving base station. For example, referring to FIG. 6B, the anchor base station 604a may send (at 635) the downlink packet to the serving base station 604b, which may send (at 637) the downlink packet to the UE 602.

Figure 10:
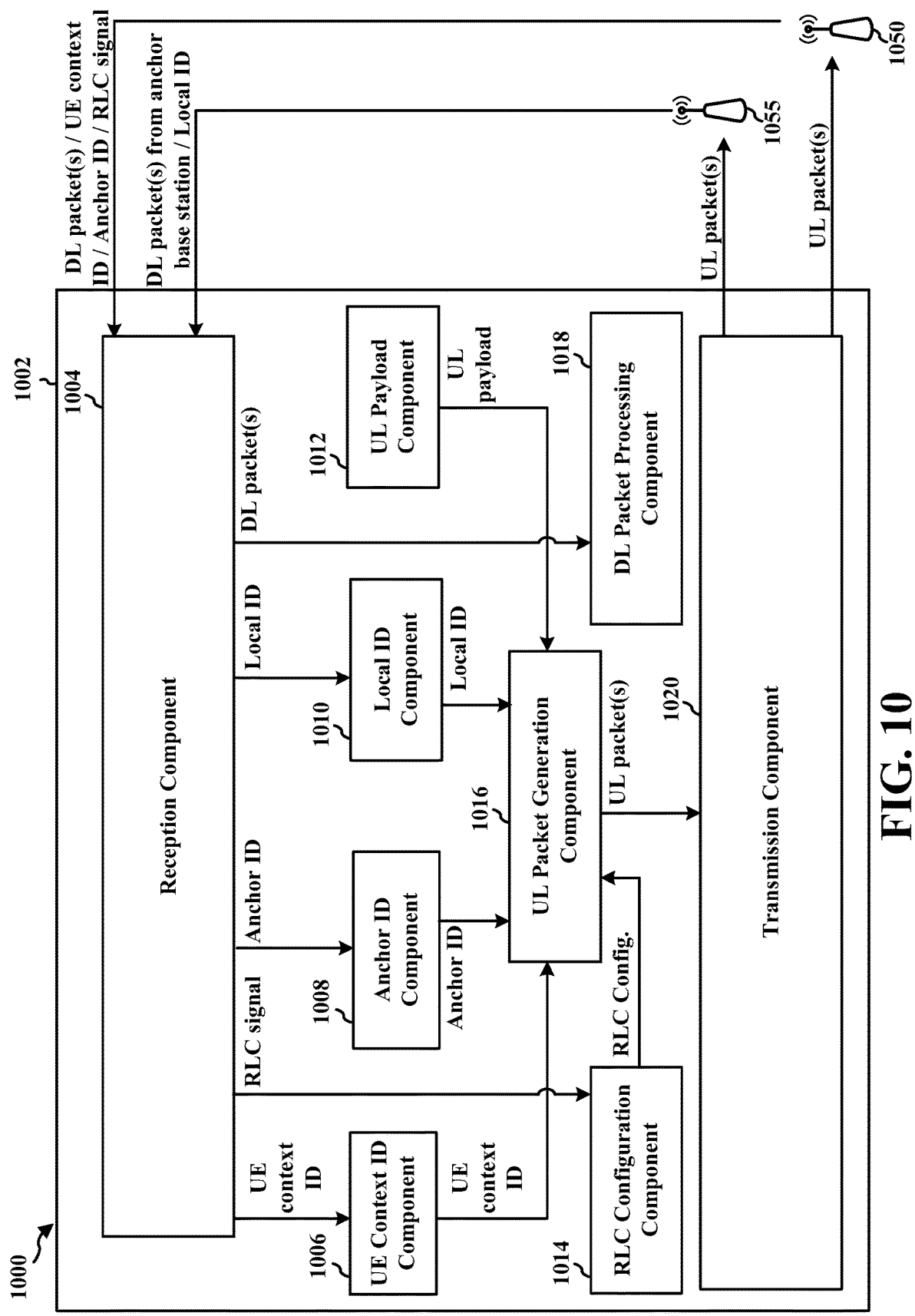
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE (e.g., the UE 104, 350, 404, 502, 602, 802, 1355, 1655, the apparatus 1002') in communication with an anchor base station 1050 (e.g., the base station 102, 180, 310, the first base station 504a, the anchor base station 604a, 1350, the apparatus 1602/1602') and a serving base station 1055 (e.g., the base station 102, 180, 310, the second base station 504b, the serving base station 604b, 1650, the apparatus 1302/1302'). The apparatus may include a reception component 1004, a UE context ID component 1006, an anchor ID component 1008, a local ID component 1010, a UL payload component 1012, an RLC configuration component 1014, a UL packet generation component 1016, a DL packet processing component 1018, and a transmission component 1020.

In certain configurations, the reception component 1004 may be configured to receive information associated with a first identifier (e.g., anchor ID, anchor LCID, etc.) and a second identifier (e.g., UE context ID) from the anchor base station 1050. The reception component 1004 may be configured to send a signal associated with the first identifier to the anchor ID component 1008 and a signal associated with the second identifier to the UE context ID component 1006. The UE context ID component 1006 may be configured to maintain the UE context ID, and the anchor ID component 1008 may be configured to maintain the anchor ID.

In certain other configurations, the reception component 1004 may be configured to receive signaling from the anchor base station indicating the RLC configuration. In certain aspects, the signaling includes system information. The reception component 1004 may be configured to send a signal associated with the RLC configuration to the RLC configuration component 1014. The RLC configuration component 1014 may be configured to maintain information associated with the RLC configuration.

The reception component 1004 may be configured to receive information associated with a local ID from the serving base station 1055. The reception component 1004 may be configured to send a signal associated with the local ID to the local ID component 1010. The local ID component 1010 may be configured to maintain information associated with the local ID.

In certain configurations, the RLC configuration component 1014 may be configured to determine an RLC configuration associated with a packet based either on the signaling received from the anchor base station 1050 or based on information preconfigured at the RLC configuration component 1014.

In certain configurations, the UL packet generation component 1016 may be configured to generate a packet including a first identifier associated with an anchor base station, a second identifier associated with a UE context, and a payload. In certain aspects, the second identifier associated with the UE context includes an I-RNTI. The UL packet generation component 1016 may be configured to request the first identifier from the anchor ID component 1008, the second identifier from the UE context ID component 1006, UL payload from the UL payload component 1012 that may be configured to generate the UL payload, RLC configuration information from the RLC configuration component 1014, and/or the local ID from the local ID component 1010. Using the information received from one or more of the UE context ID component 1006, the anchor ID component 1008, the local ID component 1010, the UL payload component 1012, and/or the RLC configuration component 1014, the UL packet generation component may be configured to generate a UL packet. In certain configurations, the UL packet generation component 1016 may be configured to generate the packet including the first identifier associated with the anchor base station, the second identifier associated with the UE context, and the payload by generating the packet based on the determined RLC configuration.

In a first implementation, the packet may include a subheader that includes the first identifier associated with the anchor base station, a SDU that includes the payload, and a CE that includes the second identifier associated with the UE context. Additional details associated with the first implementation of the data packet generated by the UE 602 are described above in connection with FIGS. 7A and 8C.

In a first aspect of the first implementation, the packet may include a MAC PDU and the CE may include a MAC CE. In a second aspect of the first implementation, the packet may include a PDCP PDU and the CE may include a PDCP CE.

In a second implementation, the packet may include a first SDU including an RRC message that carries the second identifier associated with the UE context, a first subheader that includes the first identifier associated with the anchor base station, and a second SDU that includes the payload. In certain aspects of the second implementation, the generated packet may also include a second subheader that includes a third identifier associated with the serving base station. In certain other aspects of the second implementation, the first SDU and the second SDU may be multiplexed.

In a third implementation, the packet may include a SDU that includes an RRC message that carries the first identifier associated with the anchor base station, the second identifier associated with the UE, and the payload. In certain aspects of the second implementation, the generated packet generated may also include a subheader that includes a third identifier associated with the serving base station.

The UL packet generation component 1016 may be configured to send the UL packet to the transmission component 1020. The transmission component 1020 may be configured to send the UL packet to the anchor base station 1050 and/or the serving base station 1055.

In certain configurations, the reception component 1004 may be configured to receive data from the anchor base station 1050 via the serving base station 1055. In certain aspects, the data may include one or more of the first identifier associated with an anchor base station 1050, the second identifier associated with the UE context, or a third identifier (e.g., local ID) associated with the serving base station 1055. The reception component 1004 may be configured to send a signal associated with the received data to the DL packet processing component 1018. The DL packet processing component 1018 may be configured to process the received data.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
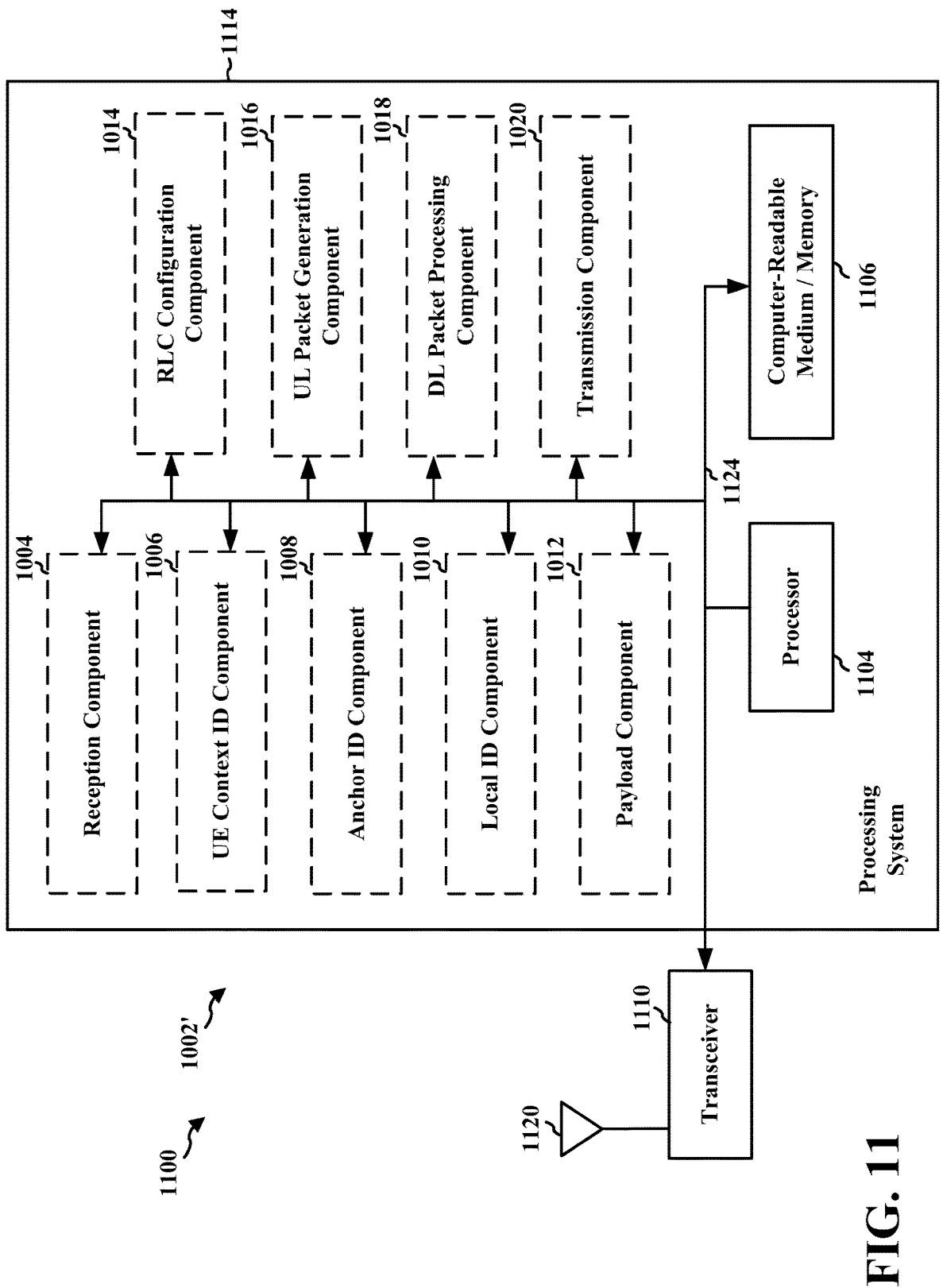
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1020, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In certain configurations, the apparatus 1002/1002' for wireless communication may include means for receiving information associated with a first identifier and a second identifier from an anchor base station. In certain other configurations, the apparatus 1002/1002' for wireless communication may include means for determining an RLC configuration associated with the packet. In certain aspects, the RLC configuration is preconfigured at the UE. In certain other aspects, the RLC configuration is determined based on the signaling. In certain other configurations, the apparatus 1002/1002' for wireless communication may include means for generating a packet including a first identifier associated with an anchor base station, a second identifier associated with a UE context, and a payload. In certain aspects, the second identifier associated with the UE context includes an I-RNTI. In a first implementation, the packet may include a subheader that includes the first identifier associated with the anchor base station, an SDU that includes the payload, and a CE that includes the second identifier associated with the UE context. In a first aspect of the first implementation, the packet may include a MAC PDU and the CE may include a MAC CE. In a second aspect of the first implementation, the packet may include a PDCP PDU and the CE may include a PDCP CE. In a second implementation, the packet may include a first SDU including an RRC message that carries the second identifier associated with the UE context, a first subheader that includes the first identifier associated with the anchor base station, and a second SDU that includes the payload. In certain aspects of the second implementation, the generated packet may also include a second subheader that includes a third identifier associated with the serving base station. In certain other aspects of the second implementation, the first SDU and the second SDU may be multiplexed. In a third implementation, the packet may include a SDU that includes an RRC message that carries the first identifier associated with the anchor base station, the second identifier associated with the UE, and the payload. In certain aspects of the second implementation, the generated packet generated may also include a subheader that includes a third identifier associated with the serving base station. In certain other configurations, the means for generating the packet including the first identifier associated with the anchor base station, the second identifier associated with the UE context, and the payload may be configured to the packet based on the determined RLC configuration. In certain other configurations, the apparatus 1002/1002' for wireless communication may include means for transmitting the packet to the serving base station. In certain aspects, the anchor base station and the serving base station may be different base stations. In certain other aspects, the anchor base station and the serving base station may be the same base station. In certain other configurations, the apparatus 1002/1002' for wireless communication may include means for receive data from the anchor base station via the serving base station. In certain aspects, the data may include one or more of the first identifier associated with an anchor base station, the second identifier associated with the UE context, or a third identifier associated with the serving base station. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
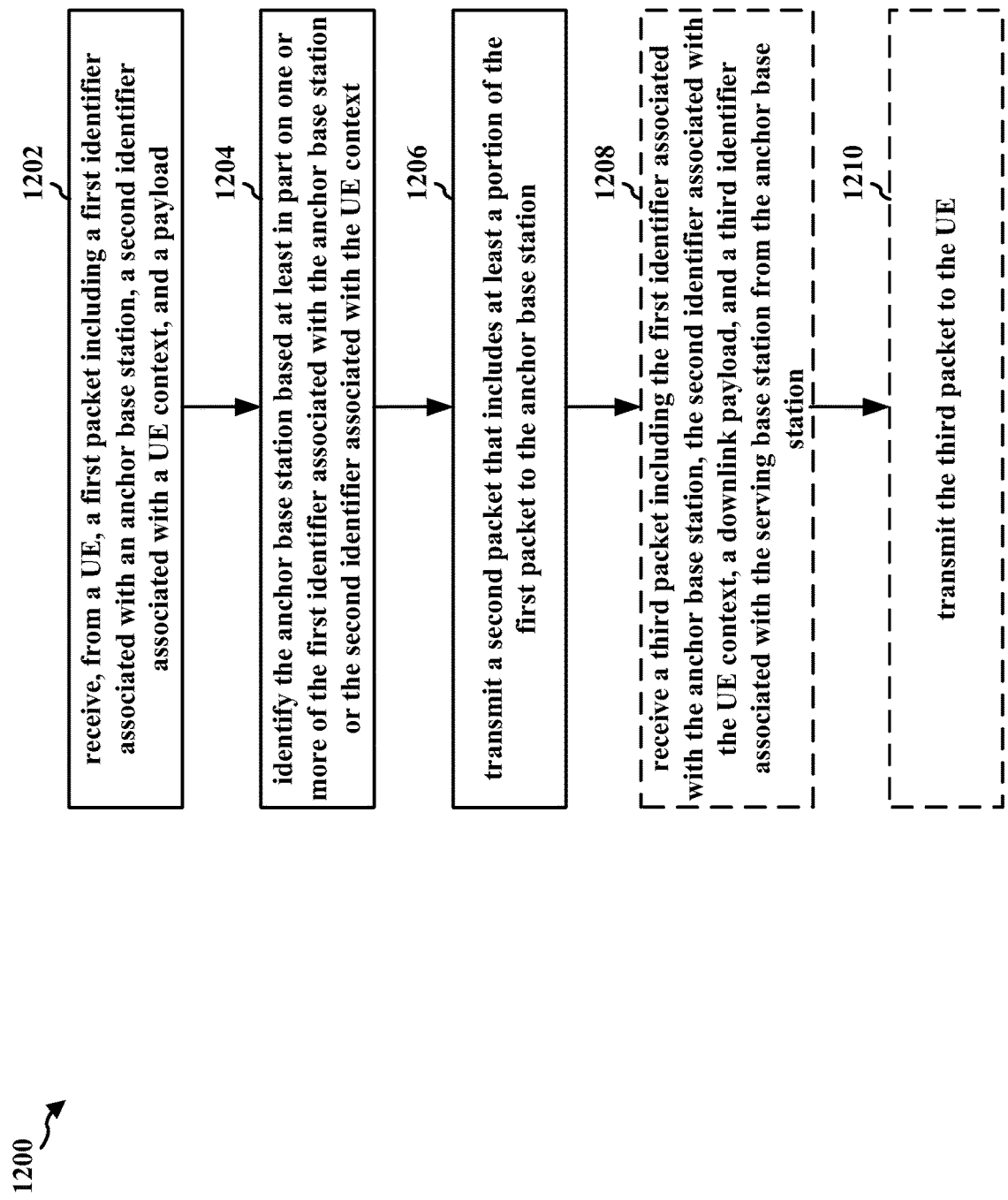
FIG. 12 is a flowchart of a method of wireless communication.

FIG. 12 is a flowchart 1200 of a method of wireless communication. The method may be performed by a serving base station (e.g., the base station 102, 180, 310, the second base station 504*b*, the serving base station 604*b*, 1055, 1650, the apparatus 1302/1302'). In FIG. 12, optional operations are indicated with dashed lines. The method may improve communication between a UE in an inactive mode and a network. Aspects may reduce network overhead and improve the efficiency of the communication and power use at the UE.

At 1202, the serving base station may receive, from a UE, a packet including a first identifier associated with an anchor base station, a second identifier associated with a UE context, and a payload. In certain aspects, the second identifier associated with the UE context includes an I-RNTI. In certain other aspects, the first packet may include an RLC configuration. In certain other aspects, the RLC configuration is configured by a RAN. In certain other aspects, the RLC configuration is preconfigured at the UE. For example, referring to FIG. 6A, the serving base station may receive (at 619) a packet from UE 602 via IDT.

In a first implementation, the packet may include a subheader that includes the first identifier associated with the anchor base station, a SDU that includes the payload, and a CE that includes the second identifier associated with the UE context. Additional details associated with the first implementation of the data packet generated by the UE 602 are described above in connection with FIGS. 7A and 8C.

In a first aspect of the first implementation, the packet may include a MAC PDU and the CE may include a MAC CE. Additional details associated with the first aspect of the first implementation of the generated packet are described above in connection with FIG. 7A.

In a second aspect of the first implementation, the packet may include a PDCP PDU and the CE may include a PDCP CE. Additional details associated with the first aspect of the first implementation are described above in connection with FIG. 8C.

In a second implementation, the packet may include a first SDU including an RRC message that carries the second identifier associated with the UE context, a first subheader that includes the first identifier associated with the anchor base station, and a second SDU that includes the payload. In certain aspects of the second implementation, the generated packet may also include a second subheader that includes a third identifier associated with the serving base station. In certain other aspects of the second implementation, the first SDU and the second SDU may be multiplexed. Additional details associated with the second implementation are described above in connection with FIG. 7B.

In a third implementation, the packet may include a SDU that includes an RRC message that carries the first identifier associated with the anchor base station, the second identifier associated with the UE, and the payload. In certain aspects of the second implementation, the generated packet generated may also include a subheader that includes a third identifier associated with the serving base station. Additional details associated with the third implementation are described above in connection with FIG. 7C.

At 1204, the serving base station may identify the anchor base station based at least in part on one or more of the first identifier associated with the anchor base station or the second identifier associated with the UE context. For example, referring to FIG. 6B, the serving base station 604*b* may identify (at 621) the anchor base station 604*a* (e.g., that maintains the UE context for the UE 602) based at least in part on one or more of the first identifier associated with the anchor base station or the second identifier associated with the UE context.

At 1206, the serving base station may transmit a second packet to the anchor base station. In certain aspects, the second packet may include at least a portion of the first packet. In certain other aspects, the second packet includes the first identifier associated with the anchor base station and the payload. In certain other aspects, the second packet may include the first identifier associated with the anchor base station, the second identifier associated with the UE context, and the payload. In certain other aspects, the second packet further may include a third identifier associated with the serving base station. For example, referring to FIG. 6B, the serving base station 604b may send (at 623) the packet (e.g., second packet) to the anchor base station 604a. The packet sent (at 623) by the serving base station 604b may include a third identifier associated with the serving base station 604b (e.g., temporary ID, local LCD, etc.). Additional details associated with the contents of the second packet are described above in connection with FIGS. 8B-8G.

At 1208, the serving base station may receive a third packet from the anchor base station, the third packet including the first identifier associated with the anchor base station, the second identifier associated with the UE context, a downlink payload, and a third identifier associated with the serving base station. For example, referring to FIG. 6B, the anchor base station 604a may send (at 635) the downlink packet to the serving base station 604b.

At 1210, the serving base station may transmit the third packet to the UE. Referring to FIG. 6B, the serving base station 604b may send (at 637) the downlink packet to the UE 602.

Figure 13:
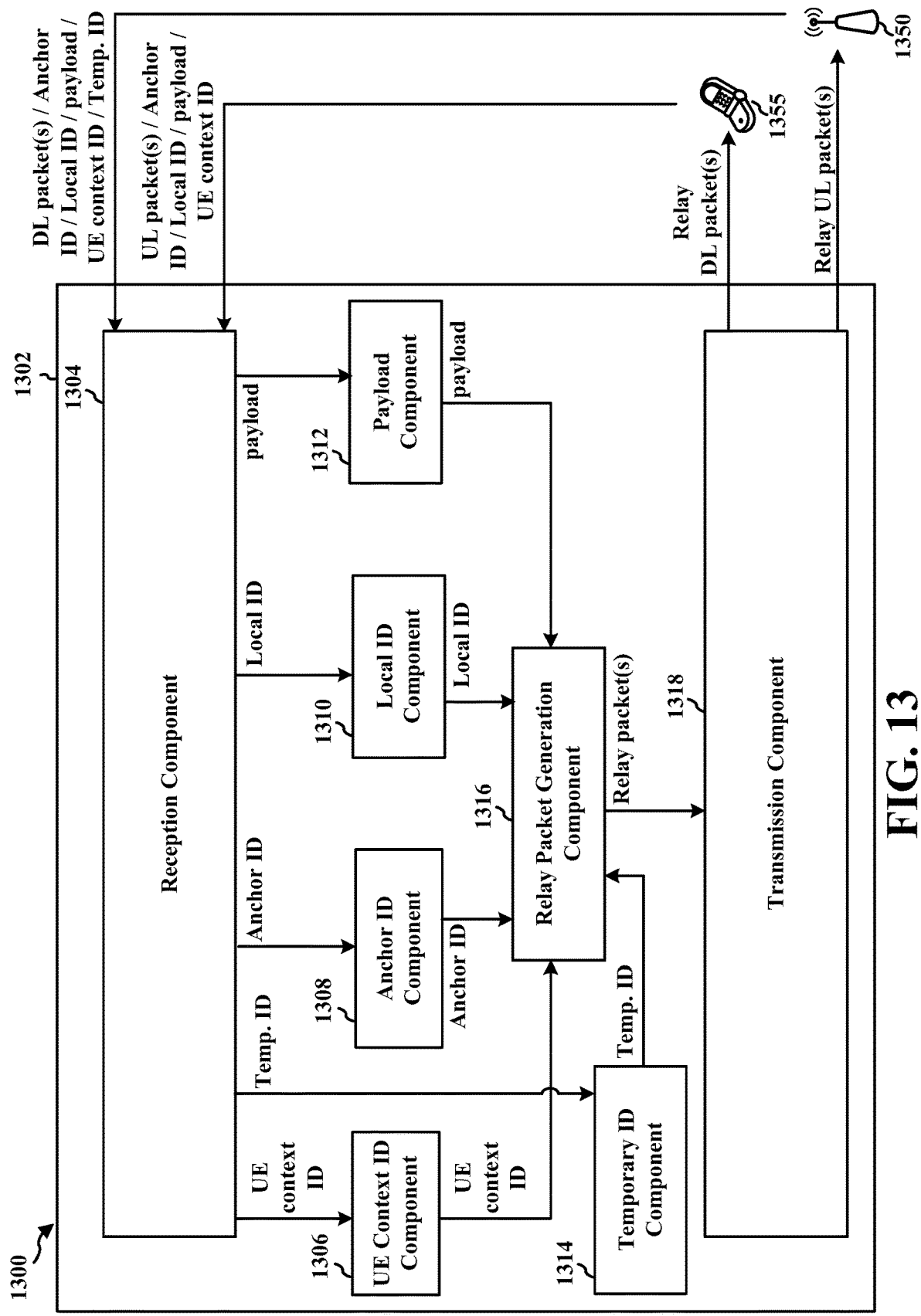
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a serving base station (e.g., the base station 102, 180, 310, the second base station 504b, the serving base station 604b, 1055, 1650, the apparatus 1302') in communication with a UE 1355 (e.g., the UE 104, 350, 404, 502, 602, 802, 1655, the apparatus 1002/1002') and an anchor base station 1350 (e.g., the base station 102, 180, 310, the first base station 504a, the anchor base station 604a, 1050, the apparatus 1602/1602'). The apparatus may include a reception component 1004, a UE context ID component 1306, an anchor ID component 1308, a local ID component 1310, a payload component 1312, a temporary ID component 1314, a relay packet generation component 1316, and a transmission component 1318.

The reception component 1304 may be configured to receive, from the 1355, a packet including a first identifier associated with an anchor base station, a second identifier associated with a UE context, and a payload. In certain aspects, the second identifier associated with the UE context includes an I-RNTI. In certain other aspects, the first packet may include an RLC configuration. In certain other aspects, the RLC configuration is configured by a RAN.

In a first implementation, the packet may include a subheader that includes the first identifier associated with the anchor base station, a service data unit (SDU) that includes the payload, and a CE that includes the second identifier associated with the UE context. Additional details associated with the first implementation of the data packet generated by the UE 602 are described above in connection with FIGS. 7A and 8C.

In a first aspect of the first implementation, the packet may include a MAC PDU and the CE may include a MAC CE. In a second aspect of the first implementation, the packet may include a PDCP PDU and the CE may include a PDCP CE.

In a second implementation, the packet may include a first SDU including an RRC message that carries the second identifier associated with the UE context, a first subheader that includes the first identifier associated with the anchor base station, and a second SDU that includes the payload. In certain aspects of the second implementation, the generated packet may also include a second subheader that includes a third identifier associated with the serving base station. In certain other aspects of the second implementation, the first SDU and the second SDU may be multiplexed.

In a third implementation, the packet may include a SDU that includes an RRC message that carries the first identifier associated with the anchor base station, the second identifier associated with the UE, and the payload. In certain aspects of the second implementation, the generated packet generated may also include a subheader that includes a third identifier associated with the serving base station.

The reception component 1304 may be configured to send the UE context ID to the UE context ID component 1306 that is configured to maintain the UE context ID. The reception component 1304 may be configured to send the anchor ID to the anchor ID component 1308 that is configured to maintain the anchor ID. The reception component 1304 may be configured to send the payload to the payload component 1312 that is configured to maintain the payload. The reception component 1304 may be configured to send the local ID to the local ID component 1310 that is configured to maintain and generate the local ID.

One or more of the UE context ID component 1306 and/or the anchor ID component 1308 may be configured to identify the anchor base station 1350 based at least in part on one or more of the first identifier associated with the anchor base station or the second identifier associated with the UE context.

The relay packet generation component 1316 may be configured to generate a second packet based on the first packet using the UE context ID, the anchor ID, the local ID, the payload, and/or the temporary ID generated by the temporary ID component 1314. In certain aspects, the second packet may include at least a portion of the first packet. In certain other aspects, the second packet includes the first identifier associated with the anchor base station and the payload. In certain other aspects, the second packet may include the first identifier associated with the anchor base station, the second identifier associated with the UE context, and the payload. In certain other aspects, the second packet further may include a third identifier associated with the serving base station.

The relay packet generation component 1316 may be configured to send the second packet to the transmission component 1318. The transmission component 1318 may be configured to transmit a second packet to the anchor base station.

The reception component 1304 may be configured to receive a third packet from the anchor base station 1350. In certain aspects, the third packet may include the first identifier associated with the anchor base station 1350, the second identifier associated with the UE context, a downlink payload, and a third identifier associated with the serving base station. The reception component may be configured to send the first identifier to the anchor ID component 1308, the second identifier to the UE context ID component 1306, the payload to the payload component 1312, and the temporary ID to the temporary ID component 1314. The relay packet generation component 1316 may be configured to generate a packet for transmission to the UE 1355 based on the received third packet.

The relay generation component 1316 may be configured to send the generated packet to the transmission component 1318, and the transmission component 1318 may be configured to transmit the third packet to the UE 1355.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
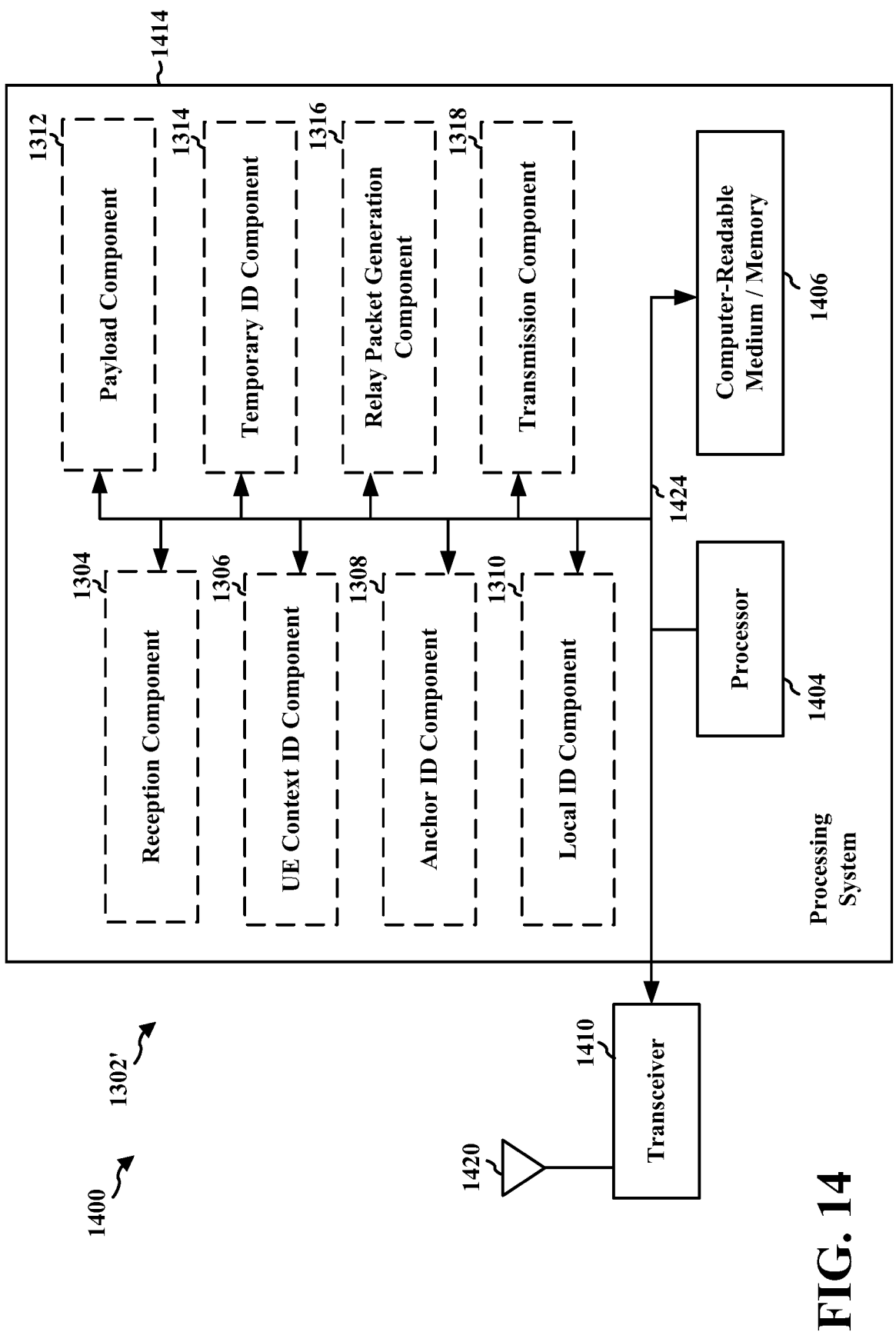
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1318, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In certain configurations, the apparatus 1302/1302' for wireless communication may include means for receiving, from a UE, a packet including a first identifier associated with an anchor base station, a second identifier associated with a UE context, and a payload. In certain aspects, the second identifier associated with the UE context includes an I-RNTI. In certain other aspects, the first packet may include an RLC configuration. In certain other aspects, the RLC configuration is configured by a RAN. In certain other aspects, the RLC configuration is preconfigured at the UE. In a first implementation, the packet may include a subheader that includes the first identifier associated with the anchor base station, a SDU that includes the payload, and a CE that includes the second identifier associated with the UE context. In a first aspect of the first implementation, the packet may include a MAC PDU and the CE may include a MAC CE. In a second aspect of the first implementation, the packet may include a PDCP PDU and the CE may include a PDCP CE. In a second implementation, the packet may include a first SDU including an RRC message that carries the second identifier associated with the UE context, a first subheader that includes the first identifier associated with the anchor base station, and a second SDU that includes the payload. In certain aspects of the second implementation, the generated packet may also include a second subheader that includes a third identifier associated with the serving base station. In certain other aspects of the second implementation, the first SDU and the second SDU may be multiplexed. In a third implementation, the packet may include a SDU that includes an RRC message that carries the first identifier associated with the anchor base station, the second identifier associated with the UE, and the payload. In certain aspects of the second implementation, the generated packet generated may also include a subheader that includes a third identifier associated with the serving base station. In certain other configurations, the apparatus 1302/1302' for wireless communication may include means for identifying the anchor base station based at least in part on one or more of the first identifier associated with the anchor base station or the second identifier associated with the UE context. In certain other configurations, the apparatus 1302/1302' for wireless communication may include means for transmitting a second packet to the anchor base station. In certain aspects, the second packet may include at least a portion of the first packet. In certain other aspects, the second packet includes the first identifier associated with the anchor base station and the payload. In certain other aspects, the second packet may include the first identifier associated with the anchor base station, the second identifier associated with the UE context, and the payload. In certain other aspects, the second packet further may include a third identifier associated with the serving base station. In certain other configurations, the apparatus 1302/1302' for wireless communication may include means for receiving a third packet from the anchor base station, the third packet including the first identifier associated with the anchor base station, the second identifier associated with the UE context, a downlink payload, and a third identifier associated with the serving base station. In certain other configurations, the apparatus 1302/1302' for wireless communication may include means for transmitting the third packet to the UE. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
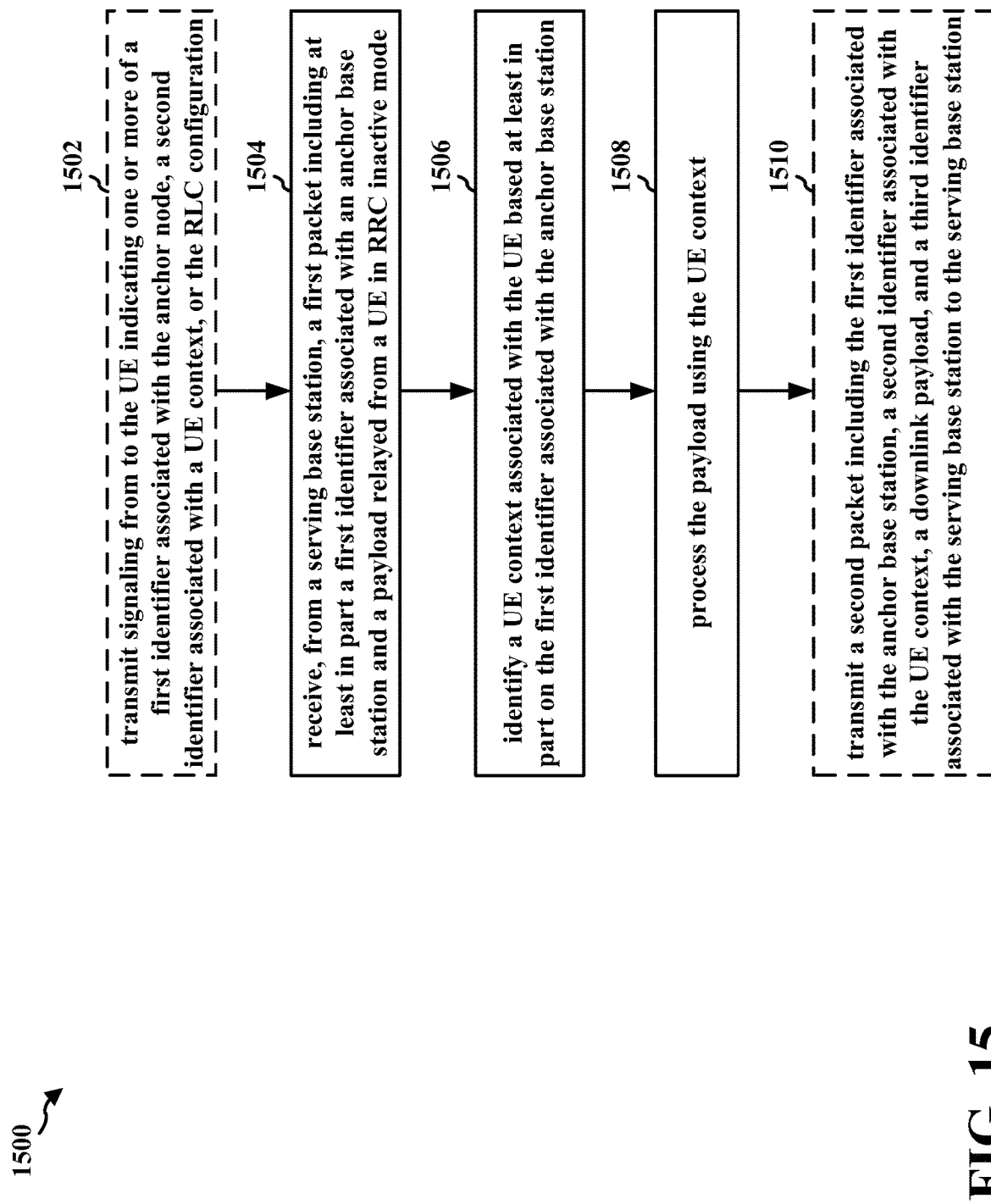
FIG. 15 is a flowchart of a method of wireless communication.

FIG. 15 is a flowchart 1500 of a method of wireless communication. The method may be performed by an anchor base station (e.g., the base station 102, 180, 310, the first base station 504*a*, the anchor base station 604*a*, 1050, 1350, the apparatus 1602/1602'). In FIG. 15, optional operations are indicated with dashed lines. The method may improve communication between a UE in an inactive mode and a network. Aspects may reduce network overhead and improve the efficiency of the communication and power use at the UE.

At 1502, the anchor base station may transmit signaling to the UE indicating the RLC configuration. In certain aspects, the signaling may include system information. For example, referring to FIG. 6A, the anchor base station 604*a* may send (at 607) the RLC configuration information to the UE 602. The RLC configuration information may be sent (at 607) using signaling and/or as system information. In certain configurations, the RLC information may be sent while the UE 602 is in active mode.

At 1504, the anchor base station may receive, from a serving base station, a first packet relayed from a UE in RRC inactive mode. In certain aspects, the first packet may include at least in part a first identifier associated with an anchor base station and a payload. In certain other aspects, the first packet may include a second identifier associated with the UE context. In certain other aspects, the first packet may include a third identifier associated with the serving base station. In certain other aspects, the first packet may include a radio link control (RLC) configuration. In certain other aspects, the RLC configuration may be preconfigured at the UE. For example, referring to FIG. 6B, the serving base station 604*b* may send (at 623) the packet (e.g., second packet) to the anchor base station 604*a*. The packet sent (at 623) by the serving base station 604*b* may include a third identifier associated with the serving base station 604*b* (e.g., temporary ID, local LCID, etc.).

At 1506, the anchor base station may identify a UE context associated with the UE based at least in part on the first identifier associated with the anchor base station. In certain other aspects, the UE context may be identified based on the second identifier associated with the UE context. For example, referring to FIG. 6B, the anchor base station 604*a* may identify (at 625) the UE context associated with the UE 602 based at least in part on the first identifier associated with the anchor base station 604*a*.

At 1508, the anchor base station may process the payload using the UE context. For example, referring to FIG. 6B, the anchor base station 604*a* may process (at 627) the packet using the UE context maintained for the UE 602.

At 1510, the anchor base station may transmit a second packet intended for the UE to the serving base station. In certain aspects, the second packet may include the first identifier associated with the anchor base station, a second identifier associated with the UE context, a downlink payload, and a third identifier associated with the serving base station. For example, referring to FIG. 6B, the anchor base station 604*a* may send (at 635) the downlink packet to the serving base station 604*b*.

Figure 16:
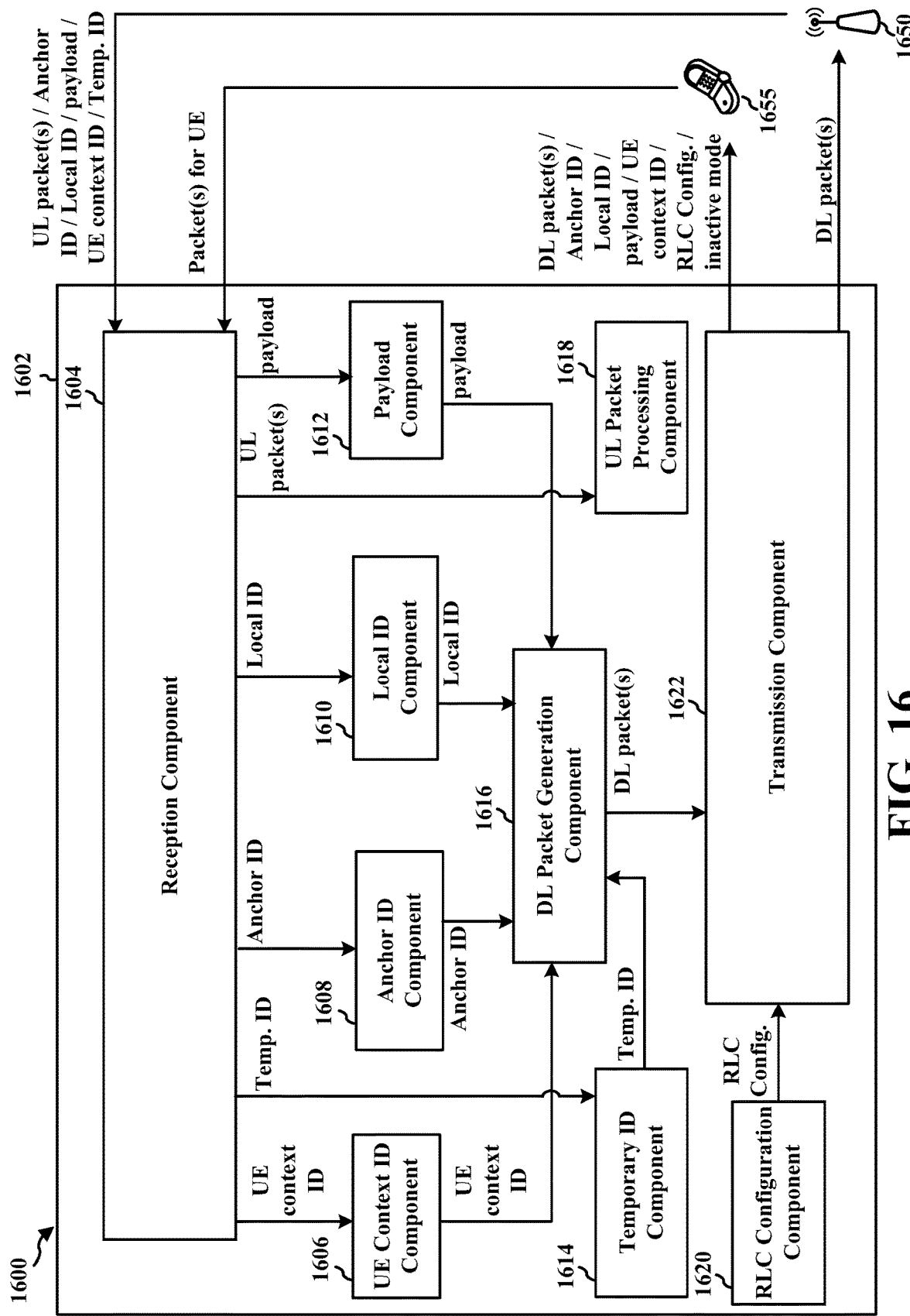
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be an anchor base station (e.g., the base station 102, 180, 310, the first base station 504*a*, the anchor base station 604*a*, 1050, 1350, the apparatus 1602') in communication with a serving base station 1650 (e.g., the base station 102, 180, 310, the second base station 504*b*, the serving base station 604*b*, 1055, the apparatus 1302/1302') and a UE 1655 (e.g., the UE 104, 350, 404, 502, 602, 802, 1355, the apparatus 1002/1002'). The apparatus may include a reception component 1604, a UE context ID component 1606, an anchor ID component 1608, a local ID component 1610, a payload component 1612, a temporary ID component 1614, a DL packet generation component 1616, a UL packet processing component 1618, an RLC configuration component 1620, and a transmission component 1622.

The UE context ID component 1606 may be configured to generate and maintain a UE context for the UE 1655 when an RRC connection with the UE 1655 is established. The anchor ID component may be configured to generate and/or maintain an anchor ID associated with the anchor base station. The RLC configuration component 1620 may be configured to maintain information associated with the RLC configuration and send a signal indicating the RLC configuration to the transmission component 1622. The UE context ID component 1606 may send the UE context ID to the transmission component 1622 and the anchor ID component 1608 may send the anchor ID to the transmission component 1622 which is configured to transmit the UE context ID, anchor ID, and/or the RLC configuration to the UE 1655.

The reception component 1604 may be configured to receive, from a serving base station 1650, a first packet relayed from a UE 1655 in RRC inactive mode. In certain aspects, the first packet may include at least in part a first identifier associated with an anchor base station and a payload. In certain other aspects, the first packet may include a second identifier associated with the UE context. In certain other aspects, the first packet may include a third identifier associated with the serving base station. In certain other aspects, the first packet may include a RLC configuration. In certain other aspects, the RLC configuration may be preconfigured at the UE. The reception component 1604 may be configured to send one or more identifiers and/or payload to the UE context ID component 1606, the anchor ID component 1608, the local ID component 1610, the payload component 1612, the temporary ID component 1614, and/or the UL packet processing component 1618.

One or more of the UE context ID component 1606 and/or the anchor ID component 1608 may be configured to identify a UE context associated with the UE based at least in part on the first identifier associated with the anchor base station. In certain other aspects, the UE context may be identified based on the second identifier associated with the UE context.

The UL packet processing component 1618 may be configured to process the payload using the UE context received from the UE context ID component 1606.

The DL packet generation component 1616 may be configured to generate a DL packet that is sent to the transmission component 1622. The transmission component 1622 may be configured to transmit a second packet intended for the UE 1655 to the serving base station 1650. In certain aspects, the second packet may include the first identifier associated with the anchor base station, a second identifier associated with the UE context, a downlink payload, and a third identifier associated with the serving base station.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
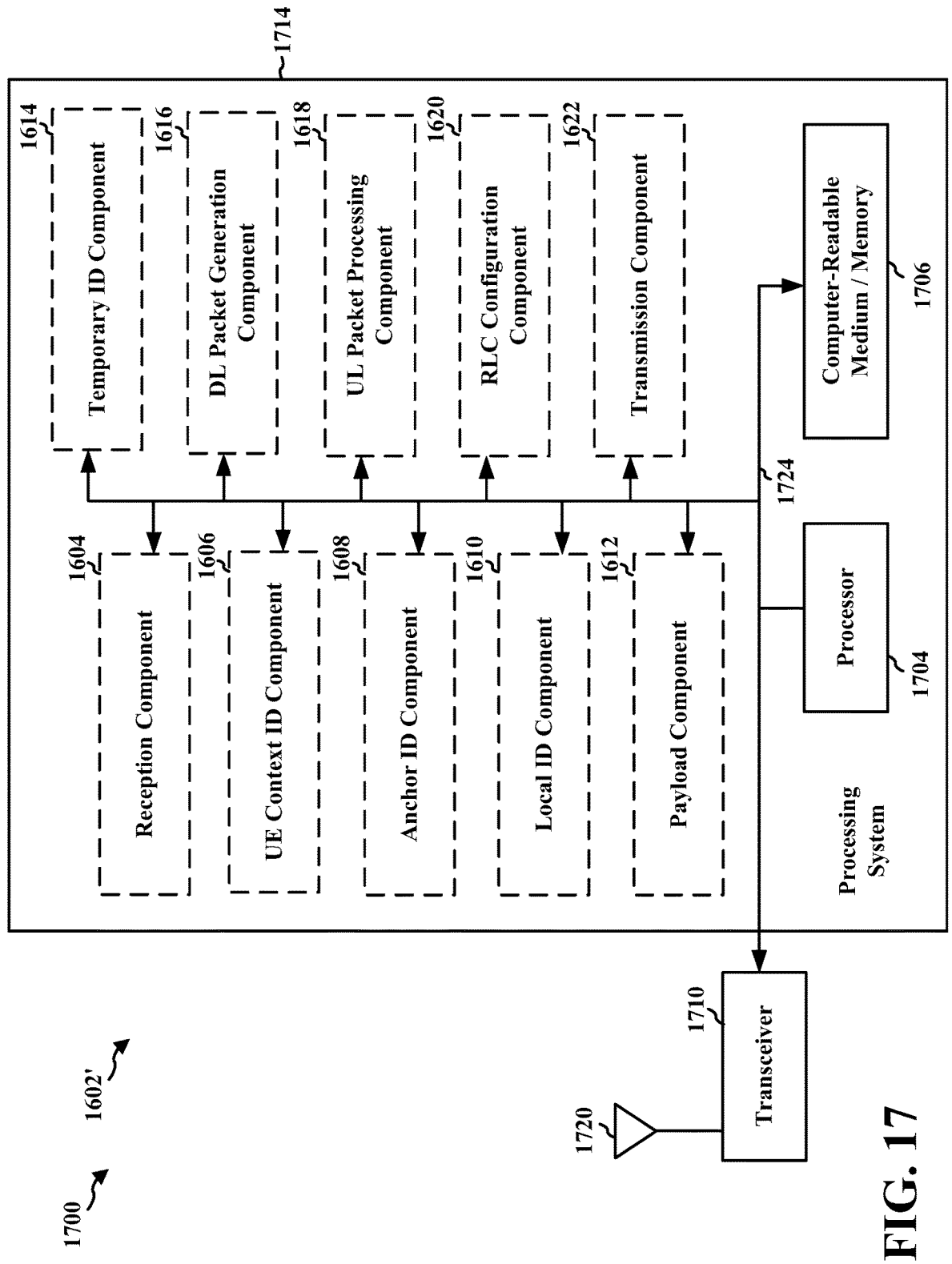
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, 1618, 1620, 1622 and the computer-readable medium/ memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1622, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, 1616, 1618, 1620, 1622. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/ processor 375.

In certain configurations, the apparatus 1602/1602' for wireless communication may include means for transmitting signaling to the UE indicating the RLC configuration. In certain aspects, the signaling may include system information. In certain other configurations, the apparatus 1602/ 1602' for wireless communication may include means for receiving, from a serving base station, a first packet relayed from a UE in RRC inactive mode. In certain aspects, the first packet may include at least in part a first identifier associated with an anchor base station and a payload. In certain other aspects, the first packet may include a second identifier associated with the UE context. In certain other aspects, the first packet may include a third identifier associated with the serving base station. In certain other aspects, the first packet may include a RLC configuration. In certain other configurations, the apparatus 1602/1602' for wireless communication may include means for identifying a UE context associated with the UE based at least in part on the first identifier associated with the anchor base station. In certain other aspects, the UE context may be identified based on the second identifier associated with the UE context. In certain other configurations, the apparatus 1602/1602' for wireless communication may include means for processing the payload using the UE context. In certain other configurations, the apparatus 1602/1602' for wireless communication may include means for transmitting a second packet intended for the UE to the serving base station. In certain aspects, the second packet may include the first identifier associated with the anchor base station, a second identifier associated with the UE context, a downlink payload, and a third identifier associated with the serving base station. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a network entity, comprising:
receiving, from a user equipment (UE) in radio resource control (RRC) inactive mode, a first packet including:
a first identifier identifying an anchor base station,
a second identifier identifying a UE context, and
a payload;
receiving, from the UE, an indication bit included in a medium access control (MAC) subheader of the first packet, the indication bit indicating that the UE supports inactive data transfer between the UE and the anchor base station;
identifying the anchor base station using at least in part on one or more of the first identifier or the second identifier; and
transmitting a second packet to the anchor base station using in part on the indication bit, the second packet including at least a portion of the first packet.

2. The method of claim 1, wherein: the first packet includes a subheader, a service data unit (SDU), and a control element (CE) and wherein: the subheader includes the first identifier, the SDU includes the payload, and the CE includes the second identifier.

3. The method of claim 2, wherein the first packet comprises a medium access control (MAC) protocol data unit (PDU) and the CE is a MAC CE.

4. The method of claim 2, wherein the first packet comprises a packet data convergence protocol (PDCP) protocol data unit (PDU) and the CE is a PDCP CE.

5. The method of claim 1, wherein: the first packet includes a first service data unit (SDU) including an RRC message, a first subheader, and a second SDU, and wherein: the RRC message includes the second identifier, the first subheader includes the first identifier, and the second SDU includes the payload.

6. The method of claim 5, wherein: the first packet further includes a second subheader, and the second subheader includes a third identifier associated with the network entity.

7. The method of claim 5, wherein the first SDU and the second SDU are multiplexed.

8. The method of claim 1, wherein: the first packet includes a service data unit (SDU) including an RRC message, and the RRC message in the SDU includes: the first identifier, the second identifier, and the payload.

9. The method of claim 8, wherein: the first packet further comprises a subheader, and the subheader includes a third identifier associated with the network entity.

10. The method of claim 1, wherein the second identifier includes an inactive radio network temporary identifier (I-RNTI).

11. The method of claim 1, wherein the second packet includes the first identifier and the payload.

12. The method of claim 1, wherein the second packet includes: the first identifier, the second identifier, and the payload.

13. The method of claim 12, wherein the second packet further includes a third identifier associated with the network entity.

14. The method of claim 1, further comprising: receiving a third packet from the anchor base station, the third packet including: the first identifier, the second identifier, a downlink payload, and a third identifier associated with the network entity; and transmitting the third packet to the UE.

15. The method of claim 1, wherein the first packet includes a radio link control (RLCI configuration.

16. The method of claim 15, wherein the RLC configuration is configured by a radio area network (RAN).

17. The method of claim 15, wherein the RLC configuration is preconfigured at the UE.

18. The method of claim 1, wherein the network entity includes a serving base station.

19. An apparatus for wireless communication at a network entity, comprising:
at least one memory; and
at least one processor coupled to the at least one memory and configured to cause the network entity to:
receive, from a user equipment (UE), a first packet including:
a first identifier identifying an anchor base station,
a second identifier identifying a UE context, and
receive, from the UE, an indication bit included in a medium access control (MAC) subheader of the first packet, the indication bit indicating that the UE supports inactive data transfer between the UE and the anchor base station;
identify the anchor base station using at least in part on one or more of the first identifier or the second identifier; and
transmit a second packet to the anchor base station using in part on the indication bit, the second packet including at least a portion of the first packet.

20. The apparatus of claim 19, wherein the second packet includes: the first identifier, the second identifier, and the payload.

21. The apparatus of claim 20, wherein the at least one processor is further configured to cause the network entity to: receive a third packet from the anchor base station, the third packet including: the first identifier, the second identifier, a downlink payload, and a third identifier associated with the network entity; and transmit the third packet to the UE.

22. The apparatus of claim 19, wherein the network entity includes a serving base station.

23. The apparatus of claim 19, wherein: the first packet includes a first service data unit (SDU) including an RRC message and a second SDU, and wherein: the RRC message includes the second identifier, and the second SDU includes the payload.

24. The apparatus of claim 23, wherein: the first packet further includes a second subheader, and the second subheader includes a third identifier associated with the network entity.

25. The apparatus of claim 23, wherein the first SDU and the second SDU are multiplexed.

26. The apparatus of claim 19, wherein: the first packet includes a service data unit (SDU) including an RRC message, and the RRC message in the SDU includes: the first identifier, the second identifier, and the payload.

27. The apparatus of claim 26, wherein: the first packet further comprises a subheader, and the subheader includes a third identifier associated with the network entity.

28. The apparatus of claim 19, wherein the second identifier includes an inactive radio network temporary identifier (I-RNTI).

29. The apparatus of claim 19, wherein the second packet includes the first identifier and the payload.

30. The apparatus of claim 19, wherein the first packet includes a radio link control (RLCI configuration.

* * * * *